United States Patent [19]
Ozbay et al.

[11] Patent Number: 5,406,573
[45] Date of Patent: * Apr. 11, 1995

[54] PERIODIC DIELECTRIC STRUCTURE FOR PRODUCTION OF PHOTONIC BAND GAP AND METHOD FOR FABRICATING THE SAME

[75] Inventors: Ekmel Ozbay; Gary Tuttle; Erick Michel; Kai-Ming Ho; Rana Biswas; Che-Ting Chan; Costas Soukoulis, all of Ames, Iowa

[73] Assignee: Iowa State University Research Foundation, Ames, Iowa

[ * ] Notice: The portion of the term of this patent subsequent to Aug. 2, 2011 has been disclaimed.

[21] Appl. No.: 151,274

[22] Filed: Nov. 12, 1993

Related U.S. Application Data

[63] Continuation-in-part of Ser. No. 995,248, Dec. 22, 1992, Pat. No. 5,335,240.

[51] Int. Cl.⁶ .............................................. H01S 3/18
[52] U.S. Cl. ...................................... 372/43; 372/44
[58] Field of Search ..................... 372/44, 45, 46, 50, 372/43

[56] References Cited

U.S. PATENT DOCUMENTS

| | | |
|---|---|---|
| 4,453,805 | 6/1984 | Ashkin et al. |
| 4,607,368 | 8/1986 | Hori |
| 4,632,517 | 12/1986 | Asher |
| 4,737,960 | 4/1988 | Tsang |
| 5,172,267 | 12/1992 | Yablonovitch ............... 359/515 |
| 5,187,461 | 2/1993 | Brommer et al. ............ 333/219 |

FOREIGN PATENT DOCUMENTS

WO92/15124  9/1992  WIPO.

OTHER PUBLICATIONS

"Photonic Band-Gap Structures", Yablonovitch, 1993 Optical Society of America, vol. 10, No. 2, Feb. 1993, pp. 283-295.
"Suppression of Molecular Interactions in Periodic Dielectric Structures", Kurizki et al., Physical Review Letters, vol. 61, No. 19, Nov. 7, 1988, pp. 2269-2271.
"Inhibited Spontaneous Emission in Solid-State Physics and Electronics", Yablonovitch, Physical Review Letters, vol. 58, No. 20, May 18, 1987, pp. 2059-2062.
"Existence of a Photonic Gap in Periodic Dielectric Structures", Ho. et al., Physical Review Letters, vol. 65, No. 25, Dec. 17, 1990, pp. 3152-3155.
"Existence of a Photonic Band Gap in Two Dimensions", Meade et al., Appl. Phys. Lett., vol. 61, No. 4, Jul. 27, 1992, pp. 495-497.
"Two-Dimensional Photonic Band Structures", Plihal et al., Optics Communications, vol. 80, No. 3.4, Jan. 1, 1991, pp. 199-204.
"Photonic Band Structure: The Face-Centered-Cubic Case Employing Nonspherical Atoms", Yablonovitch et al., Physical Review Letters vol. 67, No. 17, Oct. 21, 1991, pp. 2295-2298.
"Donor and Acceptor Modes in Photonic Band Structure", Yablonivitch et al., Physical Review Letters, vol.

(List continued on next page.)

Primary Examiner—Rodney B. Bovernick
Assistant Examiner—Robert E. Wise
Attorney, Agent, or Firm—Leydig, Voit & Mayer Ltd.

[57] ABSTRACT

A method for fabricating a periodic dielectric structure which exhibits a photonic band gap. Alignment holes are formed in a wafer of dielectric material having a given crystal orientation. A planar layer of elongate rods is then formed in a section of the wafer. The formation of the rods includes the step of selectively removing the dielectric material of the wafer between the rods. The formation of alignment holes and layers of elongate rods and wafers is then repeated to form a plurality of patterned wafers. A stack of patterned wafers is then formed by rotating each successive wafer with respect to the next-previous wafer, and then placing the successive wafer on the stack. This stacking results in a stack of patterned wafers having a four-layer periodicity exhibiting a photonic band gap.

24 Claims, 20 Drawing Sheets

OTHER PUBLICATIONS
67, No. 24, Dec. 9, 1991, pp. 3380–3383.

"Measurement of Photonic Band Structure in a Two-Dimensional Periodic Dielectric Array", Robertson et al., Physical Review Letters, vol. 68, No. 13, Mar. 30, 1992, pp. 2023–2026.

"Radiation Properties of a Planar Antenna on a Photonic-Crystal Substrate", Brown et al., Optical Society of America, vol. 10, No. 2, Feb. 1993, pp. 404–407.

"Enhancement and Inhibition of Radiation in Cylindrically Symmetric, Periodic Structures", Erdogan et al., Optical Society of America, vol. 10, No. 2, Feb. 1993, pp. 391–398.

"Photonic Band Structure: The Face-Centered-Cubic Case"; Yablonovitch et al.; Oct. 30, 1989; vol. 63, No. 118, Physical Review Letters, pp. 1950–1953.

"Photonic Band Structure-Yablonovitch: Analogies in Optics and Micro Electronics", Jan. 1990, pp. 117–133.

"Photonic Bound States in Periodic Dielectric Materials"; Robert D. Meade, et al.; vol. 44, No. 24; Dec. 15, 1991–II; pp. 13772–13774.

"A novel Architecture for Excluding Photons"; I. Peterson; Science News; Sep. 25, 1993.

PERIODIC DIELECTRIC STRUCTURE FOR PRODUCTION OF PHOTONIC BAND GAP AND METHOD FOR FABRICATING THE SAME

GRANT REFERENCE

This invention was made with Government support under Contract No. W-7405-Eng-82 (DOE-ISU) awarded by the Department of Energy. The Government has certain rights in the invention.

RELATED APPLICATIONS

This application is a continuation-in-part of U.S. application Ser. No. 07/995,248, filed Dec. 22, 1992, to Ho et al, now U.S. Pat. No. 5,335,240.

FIELD OF THE INVENTION

This invention relates to periodic structures of dielectric material, and more particularly to such structures which produce a photonic band gap.

BACKGROUND OF THE INVENTION

A number of studies have been done regarding propagation of electromagnetic (EM) waves in periodic dielectric structures. It has been suggested that photons in such media can be described by a photonic band theory analogous to electronic band theory in crystals because of the wave nature of photons. One result of a photonic band theory is the possibility of the existence of photonic band gaps in periodic dielectric structures. The presence of a photonic band gap around a particular frequency would mean that propagation of EM waves would be forbidden for all wave vectors (i.e., in every direction) at frequencies within the gap.

Structures exhibiting photonic band gaps could be advantageously used in a variety of microelectronic devices. For example, the efficiency of diode lasers is limited by radiative recombination, which reduces the number of carriers available for stimulated emission at the lasing frequency. If a diode laser were composed of photonic band gap material wherein the frequency of the recombinations fell within the band gap, the recombinations would be forbidden, thus improving the laser efficiency. Photonic band gap material would also be useful for making waveguides, since such material is an ideal reflector at the band gap frequencies. The output efficiencies of antennas could also be improved. In a typical dipole antenna mounted on a semiconductor substrate of a high dielectric constant (such as Si or GaAs), only a small percentage (~2%) of the power output of the antenna is radiated into free space, the remainder being radiated into the substrate. By fabricating the antenna on photonic band gap material with the antenna frequency in the band gap, the substrate would be incapable of absorbing the radiation, and most of the power would be radiated to free space. Thus, the desirability of achieving viable photonic band gap material is manifest.

At least one experimenter has reported the existence of a photonic band gap in a structure where dielectric material was arranged in a face-centered-cubic (fcc) lattice structure. That structure had spherical cavities at the lattice sites with another dielectric filling the gaps between the spheres. The filling ratio of the spheres was 86%, that is, slightly more than overlapped. The ratio of the dielectric constant of the filling dielectric to that of air in the spherical cavities was 3.5. The reported band gap only occurred in this particular structure, despite the fact that a wide variety of filling fractions and dielectric ratios were tried. It is now believed, however, that the results of that experiment were in error, and that a photonic band gap does indeed not exist in the lowest bands for dielectric spheres arranged in the fcc structure.

The present inventors have pointed out the error of that experiment and have proposed a diamond lattice crystal structure capable of achieving a true photonic band gap in a paper entitled "Existence Of A Photonic Gap In Periodic Dielectric Structures", by K. M. Ho et al., *Physical Review Letters*, Vol. 65, No. 25, pp. 3152-3155 (Dec. 17, 1990). The structures proposed in that paper have been further developed in a paper entitled "Photonic Band Gaps In Experimentally Realizable Periodic Dielectric Structures", by C. T. Chan et al., *Europhysics Letters*, 16(6), pp. 563-568 (Oct. 7, 1991).

In all cases, however, the periodic dielectric structures which have been proposed are difficult to build in the micron or submicron length scales. For example, with respect to the diamond structure discussed in these papers, the structure could be composed of dielectric spheres suspended in another material (such as air), but the suspension of the spheres in the diamond crystal structure would be difficult. As an alternative, semi-spherical holes could be drilled in dielectric slabs, and the slabs arranged to locate the holes in the required diamond structure. In that case, six holes would be required in each slab (for each crystal), and three of the holes would be relatively easy to drill, but the other three quite difficult. In addition, it is difficult when drilling holes in the micron and submicron length scales, particularly very elongated holes, to maintain the diameters exactly the same, and the crystal structure would suffer as a result.

The more recent of the two papers proposes linking of lattice sites in the crystal by means of elongated rod, and while that is a constructional improvement over the previous proposals, it is still a structure which is not readily buildable.

Thus, while theory has proposed a number of dielectric structures capable of producing photonic band gaps, the actual experiments which have resulted from the papers have utilized crystal structures which are difficult to build with precision, because of the difficulty of positioning the dielectric materials in the desired orientations with respect to each other. Moreover, while devices which may benefit from use of material exhibiting a photonic band gap exist in theory, the realization of such devices has been delayed due to the difficulties encountered in building the photonic band gap material.

SUMMARY OF THE INVENTION

Accordingly, it is a general aim of the present invention to provide a periodic dielectric structure capable of producing a photonic band gap and which is readily buildable in a practical sense.

In achieving that aim, it is an object of the present invention to produce a layered structure, in which elements of the periodic structure can be arranged with respect to each other in layers, with the layers stacked one on the other to produce a three-dimensional periodic structure capable of achieving a true photonic band gap.

In that respect, it is an object to use elements to form the respective layers which can be readily and easily fabricated, such as cylinders or rods which are primarily one-dimensional in nature, and which can be arranged with respect to each other in a layer and fixed in that layer, with additional layers stacked one on the other to form the three-dimensional structure.

Thus, it is an object to produce a periodic dielectric structure comprised of elongate rods or cylinders arranged in layers, with the layers stacked one on the other, and the respective dimensions of the rods, layers and interspersed material being such as to produce a photonic band gap at a desired frequency.

A related object is to provide a method whereby layers including the elongate elements and a supporting structure can be easily formed, such that the resulting layers can be stacked to form the three-dimensional structure.

A further object of the invention is to provide a three-dimensional structure capable of achieving a photonic band gap in which the mechanical configuration of the structure is readily tunable to achieve a desired mid-gap frequency and gap width.

A still further object is to provide a structure exhibiting the photonic band gap which can be easily modified for use in microelectronic devices.

It is a feature of the present invention that the photonic band gaps can be achieved in a periodic dielectric structure with a variety of filling ratios.

It is a further feature of the invention that photonic band gaps can be achieved in the periodic dielectric structure comprised of material which has a variety of indices of refraction among the constituent dielectrics.

In accordance with the invention, there is provided a periodic dielectric structure which exhibits a photonic band gap. A plurality of dielectric rods are arranged in layers, and the layers stacked to provide a matrix. The rods are interspersed with a material of a contrasting dielectric index. Each of the layers which form the three-dimensional structure has a plurality of rods arranged in parallel and at a given spacing. The axes of the rods in adjacent layers are rotated at 90° with respect to the neighbor layer. In alternating layers (i.e., successive layers having their axes in the same direction), the rods in one layer are offset with respect to the other by about half the inter rod spacing. Thus, a four-layer periodicity is produced. The dimensions of the rods, the spacing between the rods (laterally and vertically), and the dielectric constants of the materials are selected to produce a photonic band gap at a given wavelength.

A method is also provided for simultaneously forming entire layers of dielectric rods along with a surrounding support structure. The method embraces both forming of a single layer of dielectric rods, and forming of two adjacent, relatively rotated layers. In either case, material is selectively removed from a section of a thin wafer of dielectric material to yield elongate rods of the dielectric material, separated by air gaps. The ends of the elongate rods thus formed extend from and are supported by the remaining, surrounding dielectric material. The orientation of the rods on the wafers is such that stacking of the wafers, with a rotation of each successive wafer before stacking, creates the periodic structure required for photonic band gaps.

According to one embodiment, the elongate rods and air gaps are formed in the dielectric by using the preferential etch rate of a given symmetry plane of a crystalline material. The wafer is patterned such that the area in which the air gaps are to be formed is exposed to the etch solution for etching along the preferential plane. Etching through the wafer in these areas results in elongate rods with substantially vertical sidewalls separated by the air gaps. According to an alternative embodiment, the air gaps are formed by laser machining a dielectric to remove the material in the volume of the air gaps. According to a still further embodiment, two layers are formed simultaneously by etching through a single wafer. The preferential etch rates of two symmetry planes are used—one on the front of the wafer and one on the back—to form two layers of rods which have a relative angular displacement equal to the angle between the two symmetry planes.

A further method is provided for forming individual layers of elongate rods. A first layer of rods is formed on a substrate using photolithographic techniques. A second wafer having a special layer structure is bonded to the first substrate. This second wafer includes a transfer layer, bonded to the first substrate, an etch-stop layer and a transfer substrate, with the transfer layer being of the same dielectric material as the first substrate. Using chemical etches, the transfer substrate and etch-stop layer are selectively removed. The remaining transfer layer is then patterned to yield rods rotated with respect to those of the first substrate. Repetition of this procedure allows layers to be built up to yield a well-supported periodic structure required for photonic band gaps.

Other objects and advantages will become apparent from the following detailed description when taken in conjunction with the drawings, in which:

DETAILED DESCRIPTION OF THE PREFERRED EMBODIMENTS

While the invention will be described in connection with certain preferred embodiments, there is no intent to limit it to those embodiments. On the contrary, the intent is to cover all alternatives, modifications and equivalents included within the spirit and scope of the invention as defined by the appended claims.

Figure 1:
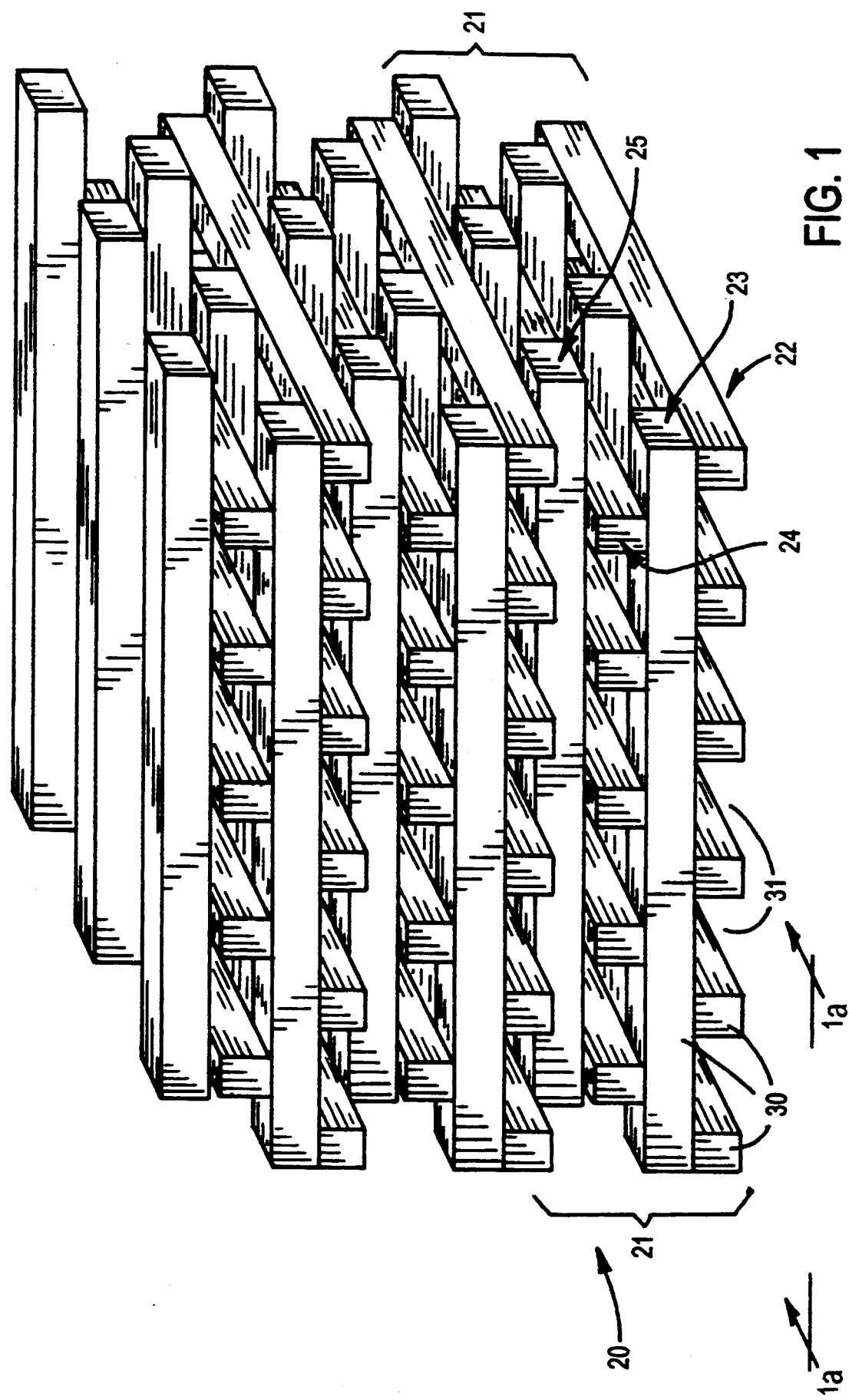
FIG. 1 is a perspective view of a dielectric structure exemplifying the present invention.

Turning now to the drawings, FIG. 1 shows a periodic dielectric structure 20 exemplifying the present invention. A group of four layers of the structure is bracketed at 21 and comprises separate layers 22, 23, 24, 25 stacked one on the other in a configuration to be described below. Each of the layers is comprised of a plurality of rods 30 interspersed by segments 31 of a material having a contrasting dielectric constant. In the FIG. 1 embodiment, the rods 30 are dielectric material and are interspersed with material of a contrasting dielectric constant, such as air or water. In a modified embodiment, both the materials 30 and 31 can be solid, such as dielectric material within an insulating foam.

The rods 30 which comprise the dielectric structure 20 of FIG. 1 are rectangular in cross section and are preferably all of the same cross sectional shape and size. The rods 30 are straight elongate members having axes which are arranged parallel with respect to each other to form a given layer, such as layer 22. The center-to-center spacing between the rods is defined as "a" (see FIG. 1a). Adjacent layers of rods have their axes oriented at right angles with respect to the neighboring layer, and thus the layer 23, which has rods 30 of the same cross section as layer 22, and the axes of its rods oriented at right angles to the axes of the rods comprising layer 22. The next successive layer, such as layer 24, thereby has its axes parallel to the axis of the rods forming layer 22, and at the same center-to-center spacing "a". The terms "alternate layer" or "alternating layers" are sometimes used herein to refer to these layers which have their axes parallel to each other and are separated by a single layer with axes rotated by 90°. Thus, in the third layer, such as layer 24, the rods are offset with respect to the layer 22, such that the rods are displaced by about half the inter rod spacing. It will be seen in FIG. 1a that rod 30a is dimensioned to be at a distance a/2 with respect to the position of the rod 30b within the layer 22. Finally, the layer 25 has the axes of its rods oriented parallel to the axes of the rods 23, and the individual rods thereof displaced about centrally between the rods 23.

It will be appreciated that the structure of FIG. 1 is relatively easy to build as compared to the structures proposed in the prior art. For example, an individual layer, such as layer 22, can be formed using a guide or template (or computer controlled formation devices), to achieve the rod configuration and spacing desired for that particular application. The layer 23 can be separately formed or formed directly on the layer 22 after the layer 22 is in place. It may be preferable, for example, to form each of the layers 22, 23, 24, 25, etc. individually, then lay the layers up one on the other. In other cases, it may be preferable to build the structure starting with the lower layer and laying additional layers on top as the structure is completed. In any event, it will be appreciated that there is a relatively easy-to-construct structure having layers, such as layer 22, formed of materials 30 and 31 of substantial dielectric contrast and at a given spacing and configuration, with subsequent layers oriented at right angles with respect to each other, and alternating layers of the same orientation disposed with the rods of one spaced between the rods of the other, so as to form a sub-structure 21 of four-layer periodicity. The structures 21 are layered one on top of the other to form a larger three-dimensional structure which will be found to exhibit a photonic band gap.

Referring again to FIG. 1a, parameters of the periodic structure will be pointed out, and will later be related to each other as they affect the ability of the structure to tune the wavelength of the forbidden gap. It will be seen that a four-layer composite is defined by the dimension "c", and the relationship between the depth (in the z dimension) and its relationship to the spacing between adjacent rods "a" will be discussed below. The aspect ratio of the rods will also be discussed. The aspect ratio is defined as the ratio between the height z of any given rod and its width x. Thus, for a rod which is shorter than it is wide (in the orientation shown in FIG. 1a), the aspect ratio will be less than unity, and for a rod which is taller than it is wide, the aspect ratio will be greater than unity. The filling ratio is the ratio of the material of the rods to the material of the matrix which surrounds the rods. Taking the example of FIG. 1, the filling ratio will be the ratio of the volume of the rods 30 as compared to the volume of air (or other material 31) interposed between the rods. Similarly, when the rods are holes (low dielectric constant) in a high dielectric block, the filling ratio is the ratio of the volume of the holes (the rods) to the volume of the high dielectric matrix.

Figure 1A:
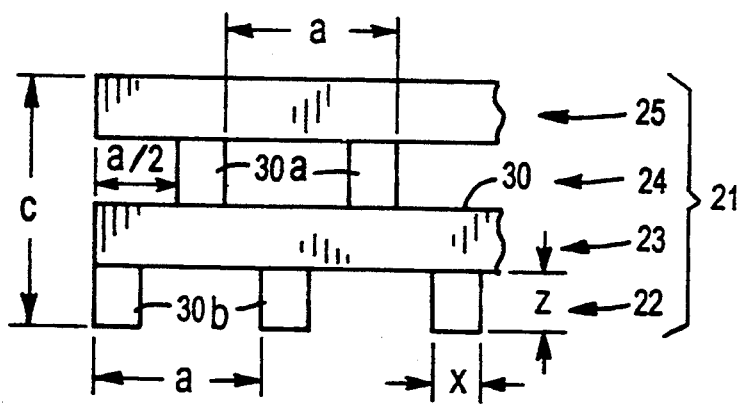
FIG. 1a is a partial view taken along the line 1a–1a of FIG. 1, showing certain geometric relationships for the periodic structure.

While FIGS. 1 and 1a show a relatively simple structure in which the layers touch but do not overlap, it is sometimes desirable to have overlapping layers. For example, as will be pointed out below, it is possible to form a dielectric structure according to the invention by drilling holes in a block of dielectric materials, with the rods being the holes in the material. In that structure it is relatively easy for the layers to overlap since the periphery of one hole can project into a layer defined by the periphery of another hole. Using solid rods, it is also possible to overlap the layers by appropriately notching the rods. It is also possible to interpose gaps of low dielectric constant material between layers. Performance-wise, that is not desirable, but when it is of constructional benefit, a relatively small space can be accommodated.

As noted above, the materials which comprise the rods and the interstices should be of different dielectric constants or refractive indices. It will be appreciated that the dielectric constant is the square of the refractive index, and the terms are used somewhat interchangeably herein, except that where a numerical contrast is specified, the refractive index is always used. Examples of a choice of high refractive index (or high dielectric constant) material are alumina, silicon, GaAs, indium phosphide, titanium dioxide and diamond. Examples of the low refractive index material (or low dielectric constant material) are air, water and silicon dioxide. The ratio of the height of a group of layers (c) to the repeat distance (a) along a layer can be varied to optimize the band gap. Also, the aspect ratio has an impact on the band gap as does the fill ratio. The cross sectional shape of the rods can also be varied, and can comprise rectangular rods as illustrated in FIG. 1 (and the special case of square rods), as well as rods of elliptical or circular cross section. Other shapes may also be useful. For example, when forming the rods by etching it may be difficult to form perfect rectangles, and the multi-sided shape or trapezoid which may result will also operate according to the invention. The stacked layers can be touching or they can overlap, or as noted above, they can be slightly separated.

With proper choice of refractive index contrasts and fill ratios, as will be pointed out below, the above structures will exhibit photonic band gaps (that is, frequency regions in which no propagating electromagnetic wave modes can exist. These photonic band gap materials can be used in various applications which require the suppression of spontaneous emission of light inside the photonic gap. For example, they can be used in laser diodes to enhance efficiency.

Figure 2:
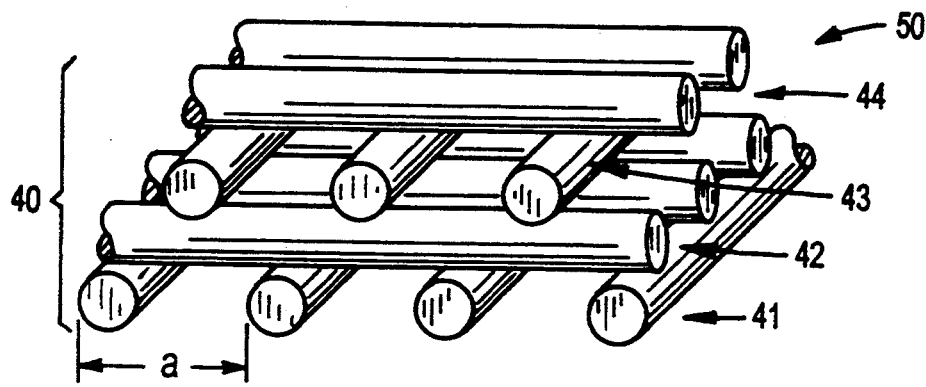
FIG. 2 is a diagrammatic structure, intended to be similar to FIG. 1, but showing the use of circular rather than rectangular rods.

Turning to FIG. 2, there is illustrated a portion of a dielectric structure, like the structure of FIG. 1, but utilizing circular rods. A series of four layers 41–44 are illustrated to comprise a four-layer periodic structure 40 comprised of a plurality of rods 46 of circular cross section. The center-to-center distance "a" between the rods is utilized in the following expressions in the same fashion as the spacing in the rectangular case of FIG. 1. Similarly, the height and the z direction of a four-layer periodic structure is defined as "c", and the aspect ratio is defined in the same way as in the prior example.

Figure 3:
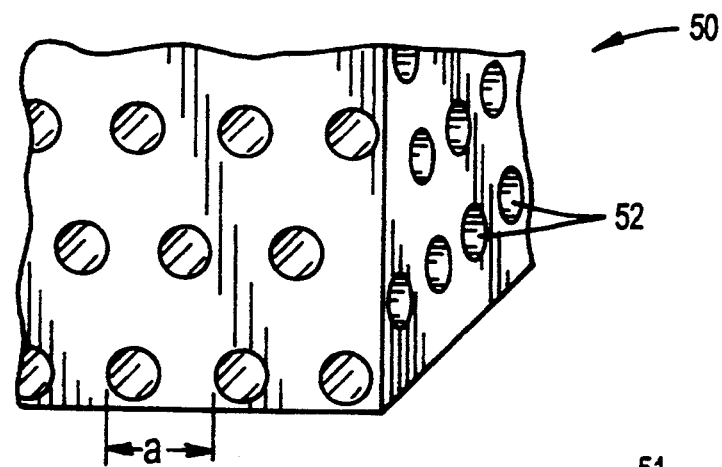
FIG. 3 is a diagrammatic view showing the inverse of the system of FIG. 2 in which the cylinders are cylindrical holes formed in a dielectric material.
Figure 4:
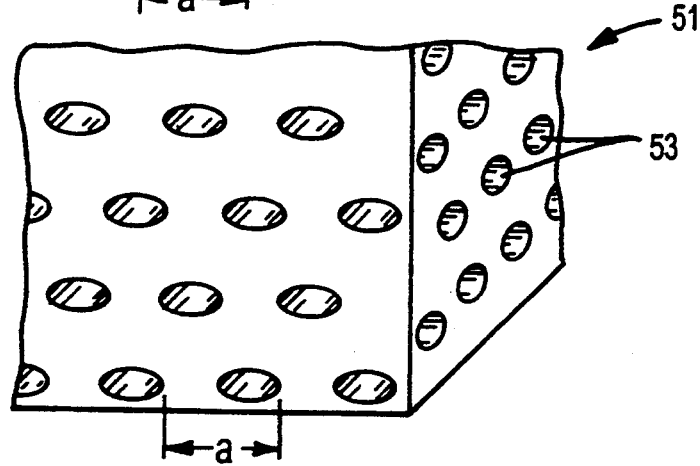
FIG. 4 is a diagram similar to FIG. 3 but showing the use of elliptical cylinders.

FIGS. 3 and 4 illustrate the converse structure where holes are formed in a block 50 or 51 of dielectric material. In the FIG. 3 embodiment, the holes 52 are circular, whereas in the FIG. 4 embodiment, the holes 53 are elliptical. The holes can be filled with air or other low dielectric index material. In both cases, the center-to-center spacing "a" is arranged as in the other embodiments. But in this case, the rod is of low dielectric material and the interstices of high dielectric material. The axes of the rods are parallel to each other, and in adjacent layers, the orientation is changed by 90° such that adjacent layers have mutually perpendicular axes. With respect to any two alternate layers (successive layers whose axes are in the same direction), the rods of one layer are arranged at the mid-point between the rods of the other layer, to produce a structure of four-layer periodicity when the layers are stacked one on the other. It will be seen by a comparison of FIG. 3 and FIG. 4 that the same conditions apply to the elliptical embodiment. In the case of FIG. 4, the ellipses can be arranged with an aspect ratio greater than unity as illustrated, or the ellipses can be rotated 90° to produce an aspect ratio which is less than unity.

We have developed a calculation method which can be used to determine the band structure of periodic materials, and thus the presence of the photonic band gap. The calculation method takes into account the vector nature of the electromagnetic field present within the structure. While it is of general applicability, we have used it for the layered structures constructed in accordance with the present invention and have determined the presence, absence and quality of a band gap produced by such structures. We have furthermore determined the effect on the gap (or on the gap/midgap ratio) of different parameters of the structure, such as filling ratio, aspect ratio, c/a ratio, rod shape, refractive index contrast, and the like.

We will first present the calculation method (and a portion of its derivation) and will thereafter illustrate the manner in which the periodic structures according to the present invention will provide the gap/mid-gap ratio. In such a periodic structure, the dielectric constant is position dependent, which allows Maxwell's equations to be written as:

$$\nabla \times E = i\left(\frac{\omega}{c}\right)H, \quad \nabla \times H = -i\left(\frac{\omega}{c}\right)\epsilon(r)E, \tag{1}$$

which can be further simplified to:

$$\nabla \times \left(\frac{1}{\epsilon(r)} \nabla \times H\right) = \frac{\omega^2}{c^2} H. \tag{2}$$

The periodic dielectric function can then be expanded using Bloch's theorem to expand the $\bar{H}$ field in plane waves, $$H(r) = \sum_G \sum_{\lambda=1}^{2} h_{G,\lambda} \theta_\lambda e^{i(K+G)\cdot r}, \tag{3}$$

substitution of equation 3 into the simplified Maxwell equation 2 results in the matrix equations:

$$\sum_{G',\lambda'} H_{G,G'}^{\lambda,\lambda'} h_{G,\lambda'} = \frac{\omega^2}{c^2} h_{G,\lambda'} \quad (4)$$

where:

$$H_{G,G'} = |k + G||k + G'| \epsilon_{G,G'}^{-1} \begin{pmatrix} e_2 \cdot e_{2'}, & -e_2 \cdot e_{1'} \\ -e_1 \cdot e_{2'}, & e_1 \cdot e_{1'} \end{pmatrix}$$

It should be noted that the periodic dielectric structure $\epsilon(\vec{l})$ only enters in the calculation through the position-dependent dielectric function which was evaluated on a fine grid in the real space unit cell and Fourier transformed into reciprocal space. This allows use of this calculation to calculate the photonic bands for any periodic arrangement of objects, including allowing them to have arbitrary shapes, filling ratios, and various index of refraction contrasts. The index of refraction contrasts refers to the ratio of the indices between the material filling the gaps between the dielectric spheres, and that of the dielectric spheres themselves.

Figure 5:
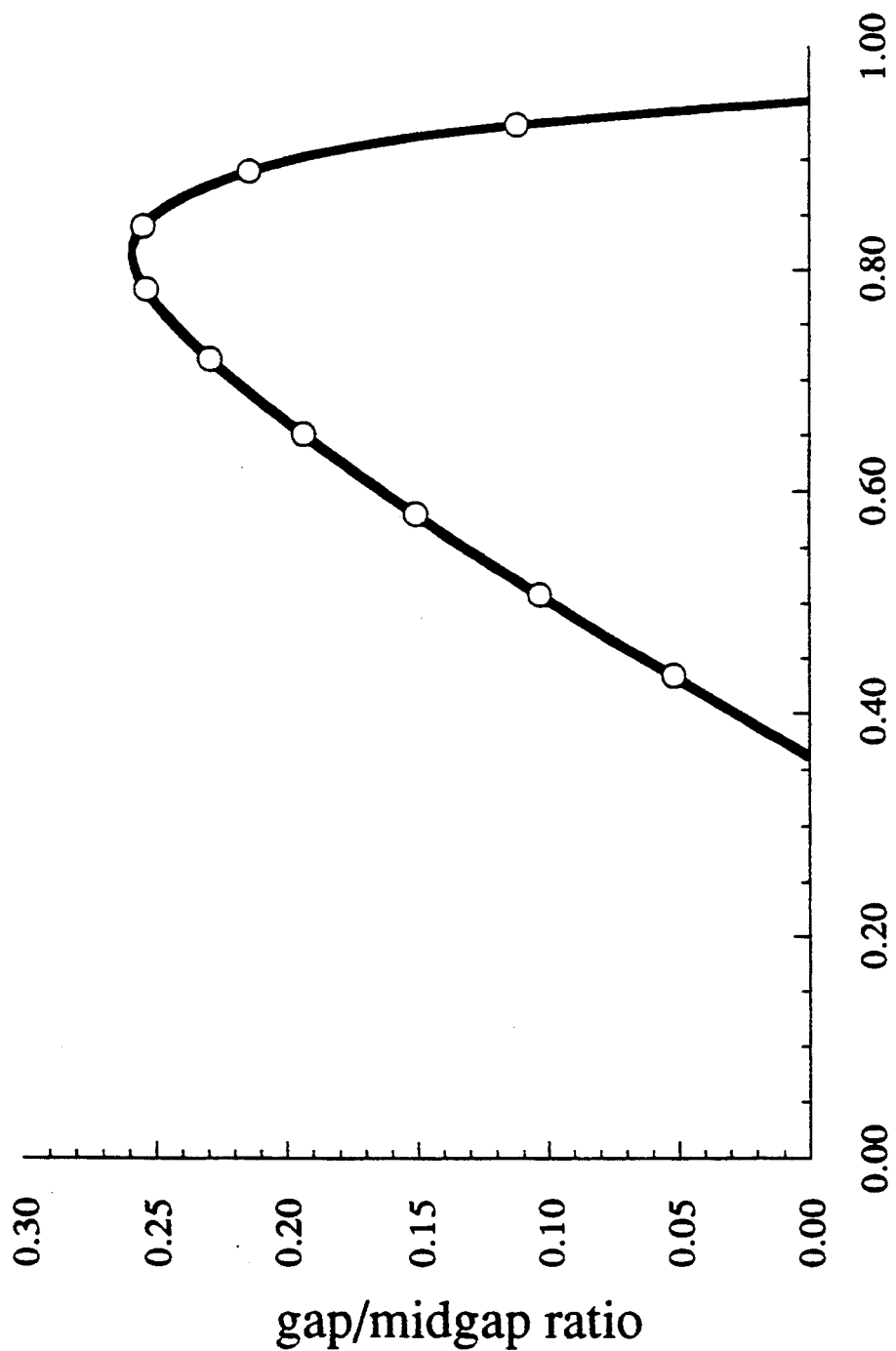
FIG. 5 is a graphical representation showing the dependence of the gap/mid-gap frequency ratio on the filling ratio for cylindrical holes in a dielectric material.

Utilizing the foregoing relationships, we have determined optimum characteristics for structures in accordance with the present invention, and those will be described in connection with FIGS. 5 through 11. FIG. 5 relates to periodic dielectric structure such as that shown in FIG. 3 which has cylindrical holes formed in a dielectric block. The refractive index contrast, that is, the ratio between the indices of the high and low index material, is taken to be 3.6 for the example of FIG. 5. It will be appreciated that a minimum refractive index contrast of about 2.0 is necessary to produce a photonic band gap in such structures. In the structure of FIG. 5, the individual rods can overlap one another, that is, the cylindrical holes in one layer can project into the succeeding layers. The ratio of the repeat distance in the z direction (identified as "c" in FIG. 1) to the repeat distance in the x and y direction "a", is taken to be 1.414 for the structure of FIG. 5. The figure illustrates the photonic band gap (normalized to the frequency at the center of the gap), in other words, the gap/mid-gap frequency ratio as a function of filling ratio. It will be seen that the maximum gap/mid-gap ratio of about 0.26 is achieved for a filling ratio of about 0.81. The wavelength of the forbidden light is proportional to and of the same magnitude as the repeat distance of the structure. Thus, the dimensions of the rods themselves can be selected to meet this criteria, with the spacing and dielectric constants selected to meet the desired gap/mid-gap ratio.

Figure 6:
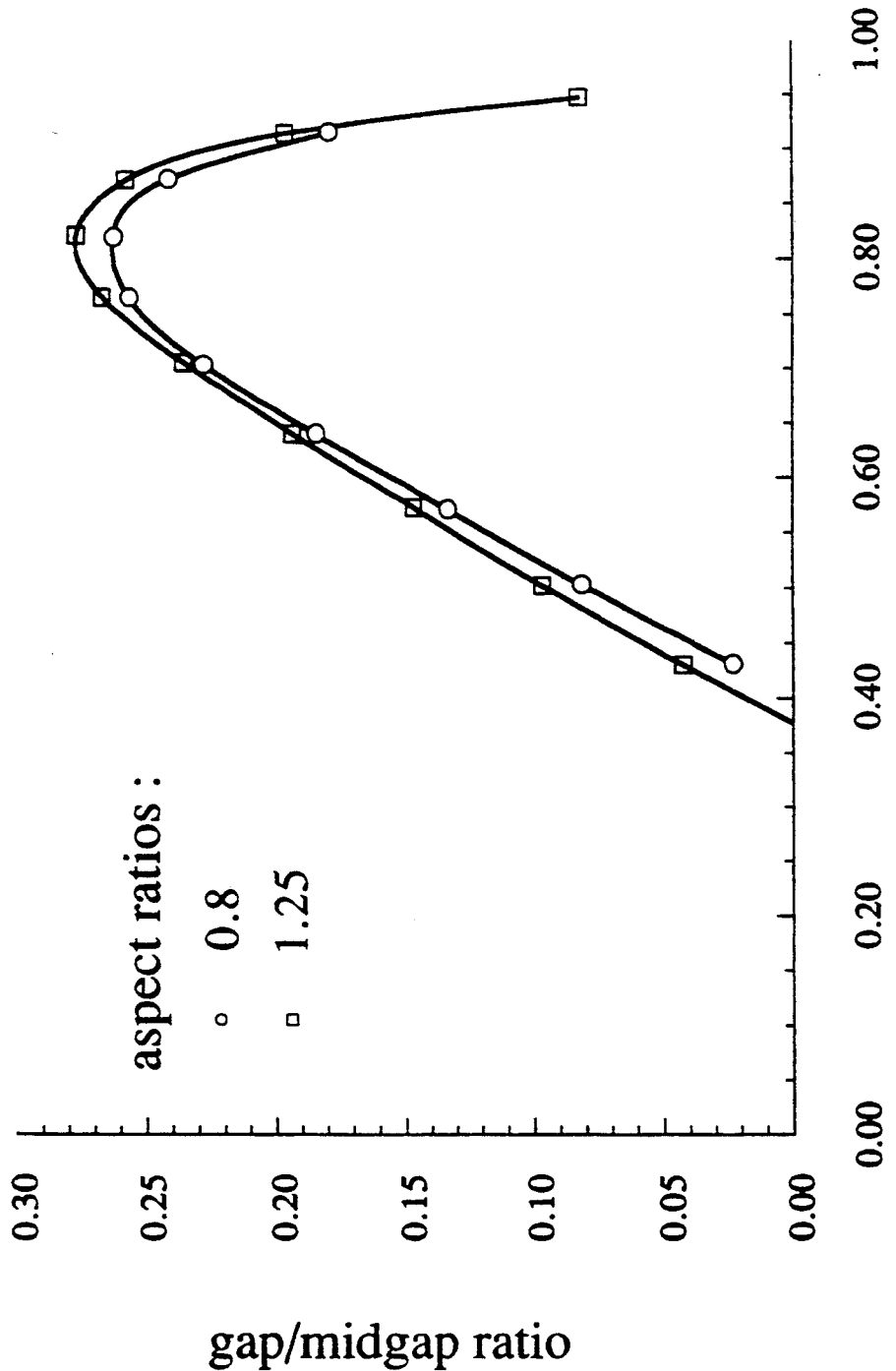
FIG. 6 is a graphic representation showing the dependence of the gap/mid-gap frequency ratio on the filling ratio for cylindrical holes of elliptical cross section in a dielectric material.

FIG. 6 illustrates the case with cylindrical holes of elliptical cross section. As in the FIG. 5 embodiment, the refractive index contrast is selected to be 3.6 and the c/a ratio is 1.414. FIG. 6 illustrates ellipses with the major axis vertical (that is, an aspect ratio which is greater than 1), and also with the major axis horizontal (that is, with an aspect ratio of less than unity). It will be seen that the structure using elliptical cross section rods operates very much like the special case of circular cross sectional rods (FIG. 5) in achieving a maximum gap/mid-gap ratio at about a filling ratio of 0.81. It will also be seen, however, particularly for aspect ratios greater than unity, that a slightly higher gap/mid-gap ratio of about 0.27 can be achieved.

Figure 7:
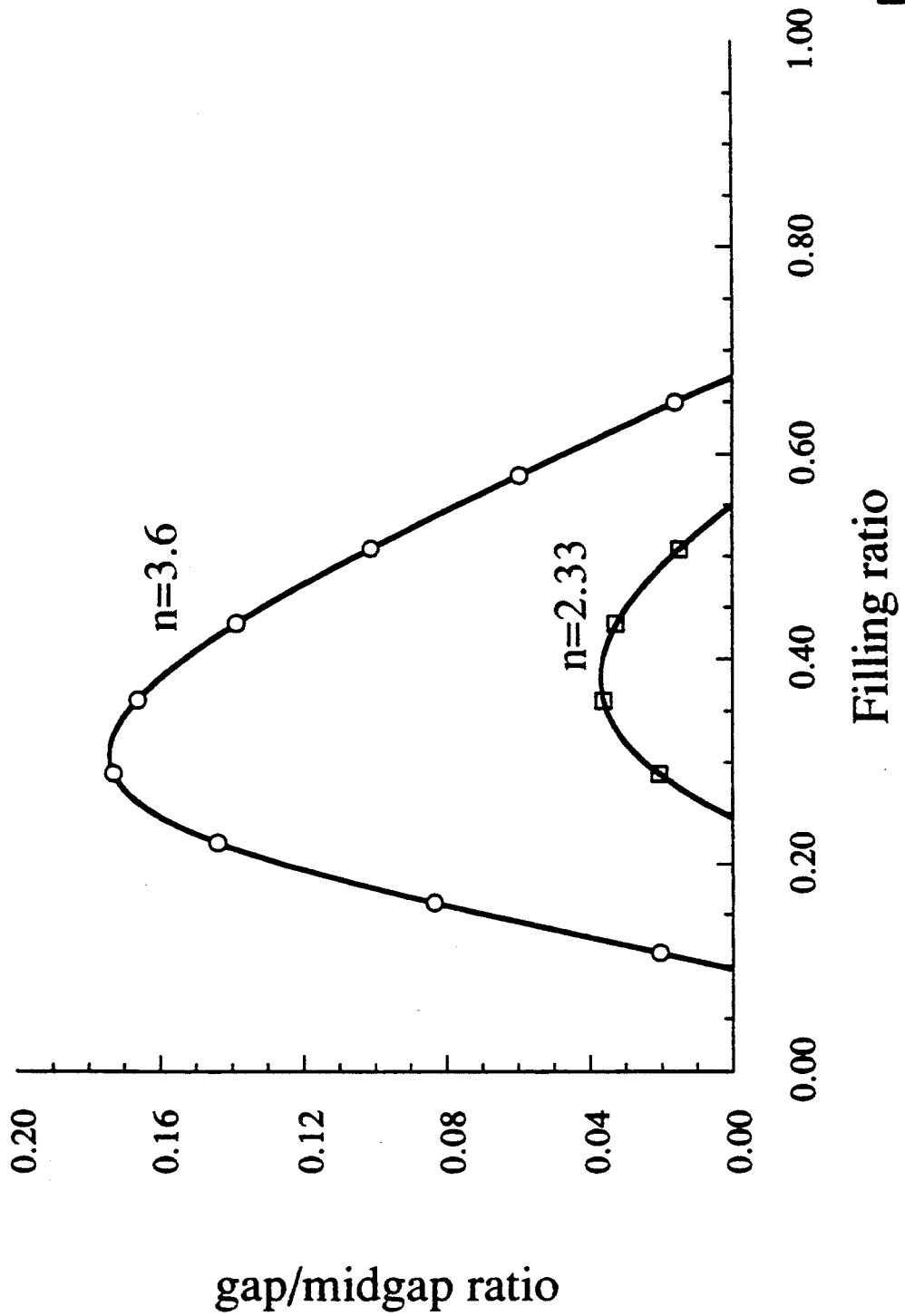
FIG. 7 is a graphical representation showing the dependence of the gap/mid-gap frequency ratio on the filling ratio for a structure comprised of stacked layers of dielectric cylinders.

FIG. 7 illustrates the case such as shown in FIG. 2 for dielectric cylinders separated by material of lower dielectric constant. The c/a ratio for the structure of FIG. 7 is also taken to be 1.414, and the diagram of FIG. 7 illustrates two cases for a refractive index contrast of 3.6 and a refractive index contrast of 2.33. For the former, it will be seen that the optimum filling ratio is about 0.25 and achieves a maximum gap/mid-gap ratio of about 0.175. For the lower contrast material, the optimum filling ratio is about 0.38, but a gap/mid-gap ratio of only 0.04 is achievable in that configuration. As in the case of FIG. 5, the structures of FIGS. 6 and 7 contemplate the condition where the rods can overlap one another. That is also the case for FIG. 8, which illustrates dielectric cylinders of rectangular cross section with an aspect ratio of 0.6. For the high dielectric contrast material (contrast of 3.6), the optimum filling ratio is about 0.21 and that can achieve a gap/mid-gap ratio of about 0.175. At lower contrast ratios, the optimum filling ratio increases, but the gap/mid-gap ratio substantially decreases. For example, at a contrast ratio of 2.33, the optimum filling ratio is about 0.3, but the gap/mid-gap ratio is only about 0.02.

We have found that the rectangular cross sectional configuration can be optimized when the separation of the rods (i.e., the dimension "a"), is about 0.7 units of length, and the height of each rod is about 0.25 units, such that the dimension "c", is one unit. The wavelength in that structure of the forbidden light is proportional to and of the same magnitude as the repeat distance of the structure. The optimum filling ratio for that structure is around 28%. For a refractive index contrast of about 3.6, the optimum gap to mid-gap ratio is around 18%. Particularly using rectangular rods, the advantage of the structure is such that it can be fabricated in a layer-by-layer fashion with relative ease. Imperfect cross sections are expected to perform in substantially the same way.

Figure 8:
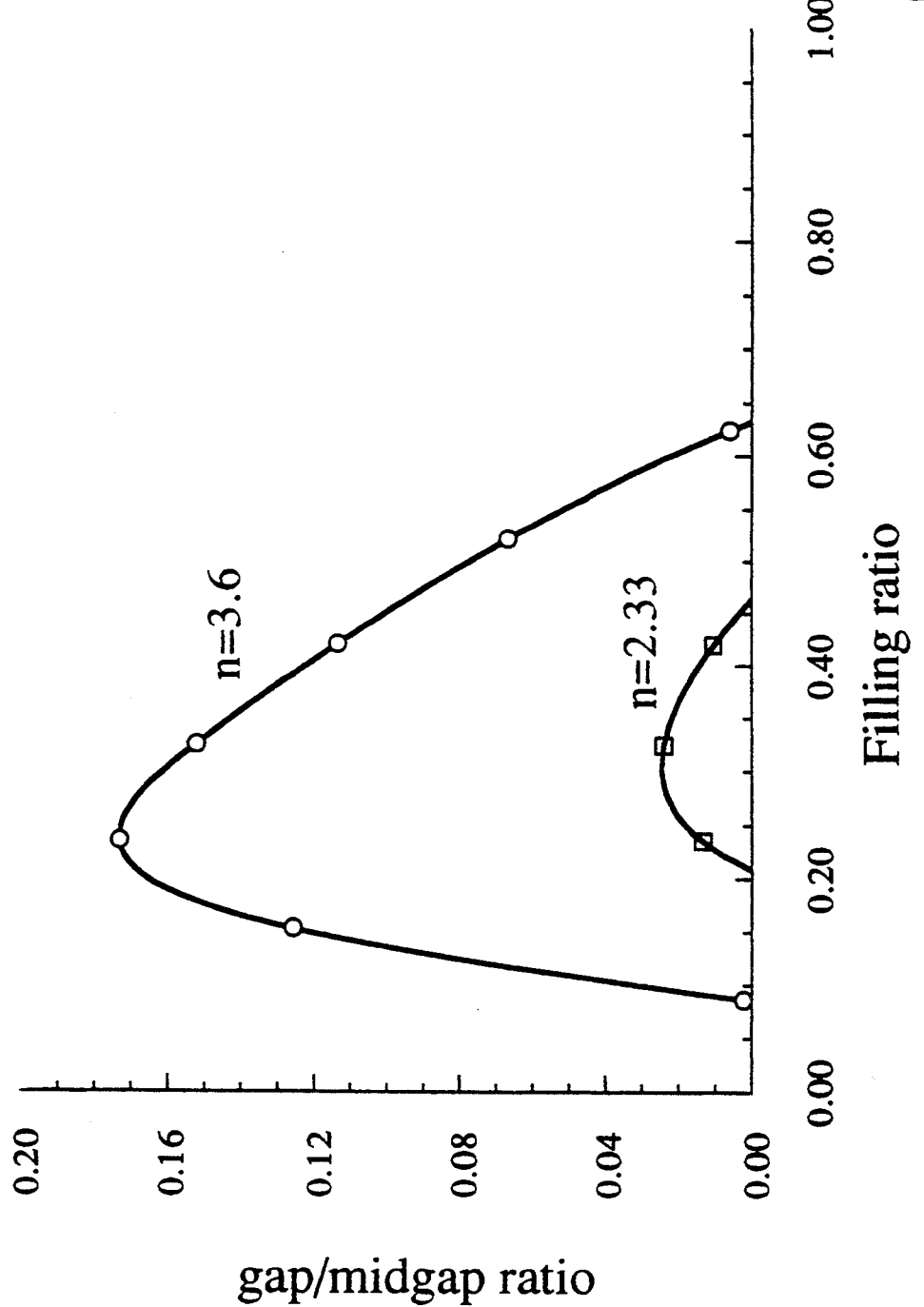
FIGS. 8 and 9 are graphical representations showing the dependence of the gap/mid-gap frequency ratio on the filling ratio for a structure comprising dielectric cylinders of rectangular cross section arranged in stacked layers.
Figure 9:
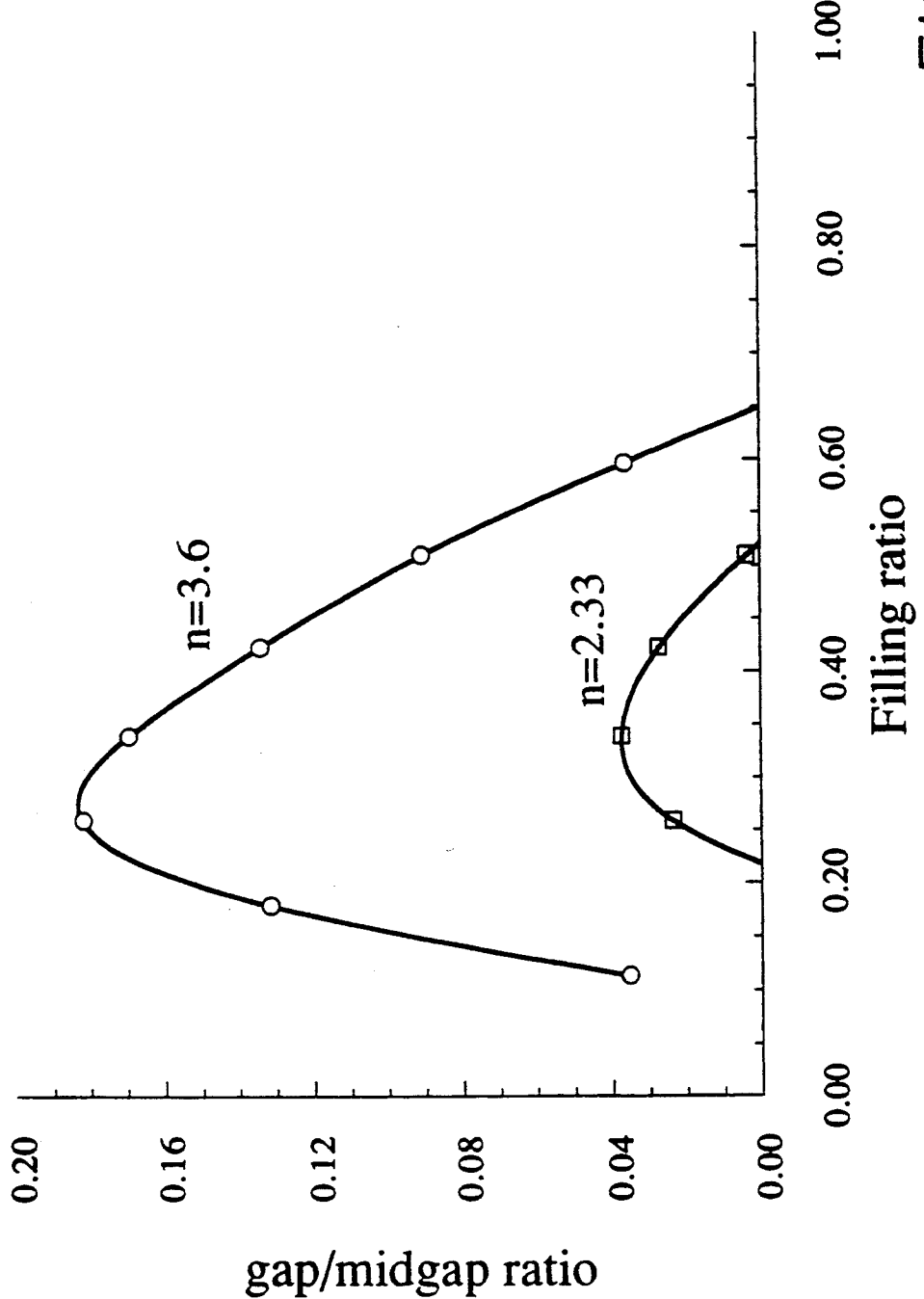

FIG. 9 shows a structure similar to that considered in connection with FIG. 8—that is, dielectric rods of rectangular cross section. The structure illustrated in FIG. 9 differs from that of FIG. 8 in that the aspect ratio is taken to be 0.8 instead of 0.6. The shapes of the curves are substantially the same, but it will be seen that the maximum gap to mid-gap ratio is slightly better than the structure of FIG. 8, approaching 0.19 at a filling ratio of about 0.3 for a refractive index contrast of 3.6.

Figure 10:
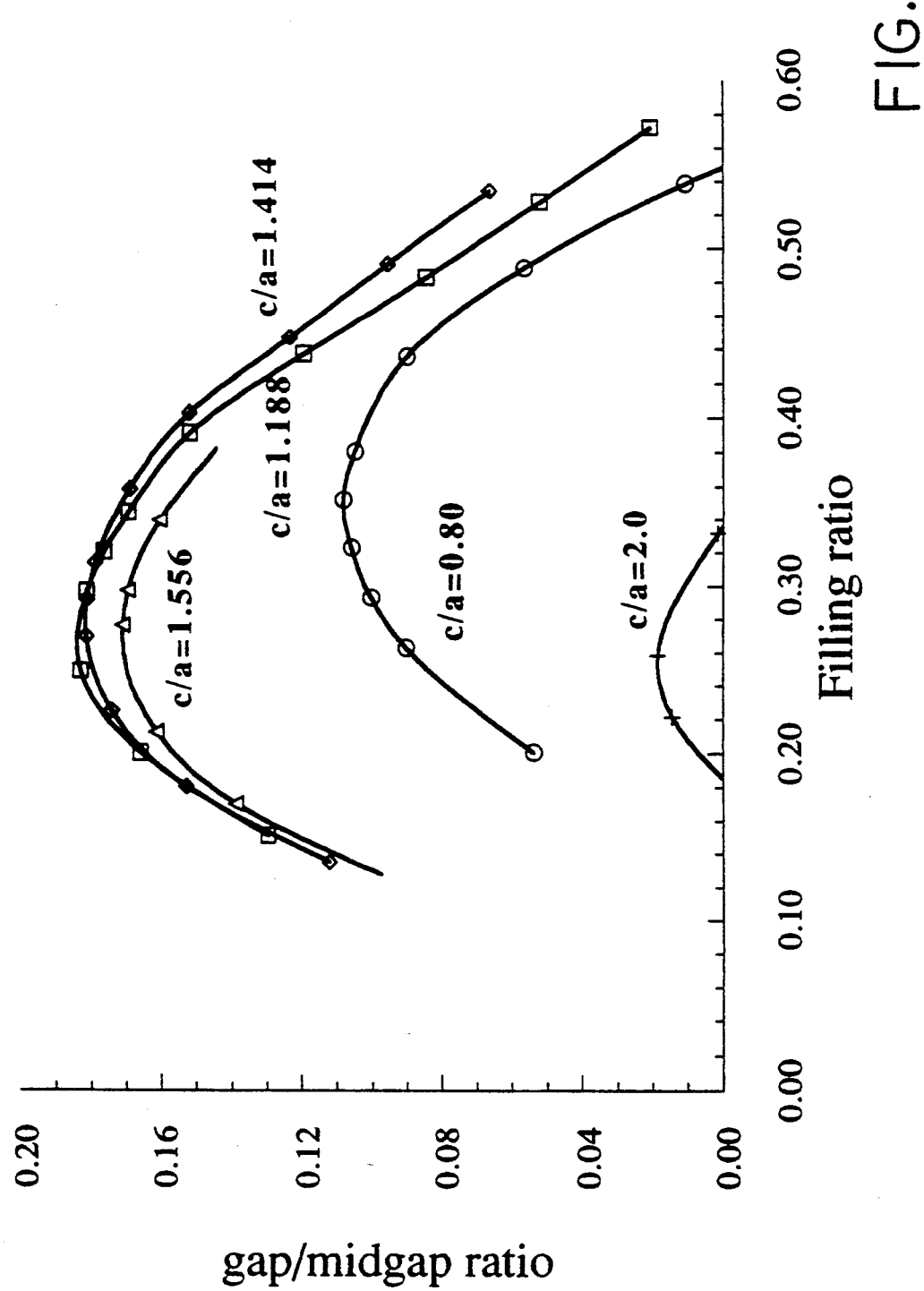
FIG. 10 is a graphical representation showing the dependence of the gap/mid-gap frequency ratio on the filling ratio for touching rectangular rods at various crystal geometries.
Figure 11:
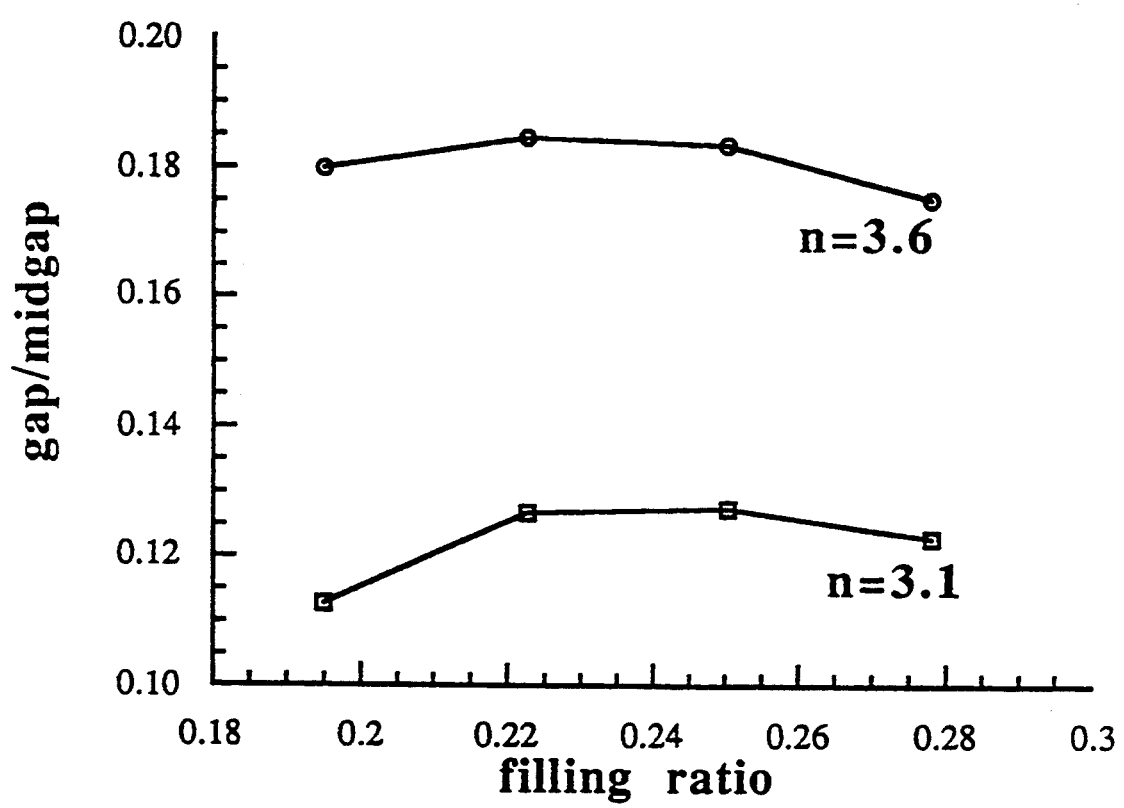
FIG. 11 is a graphical representation showing the dependence of the gap/mid-gap frequency ratio on the filling ratio for touching cylinders of circular cross section in various crystal geometries.

It is also possible to produce structures having a geometry where the rods from adjacent layers touch each other but do not overlap. Such a structure, for example, is illustrated in FIG. 1, where the adjacent layers have only a line of contact but no overlap. FIG. 10 illustrates the results which can be achieved by contacting rectangular cylinders (such as in FIG. 1) as a function of filling ratio for various c/a ratios. The refractive index contrast adopted for the structure of FIG. 10 is 3.6. For the touching geometries, variation of the filling ratio of the structure is accompanied by a corresponding change in aspect ratio of the rectangular cross section in order to maintain contact between cylinders in adjacent layers while still achieving the desired filling ratio. It will be seen that utilizing that geometry gap/mid-gap ratios of about 0.18 are achievable. FIG. 11 illustrates the results for touching cylinders with circular cross section. In this case, changes in the filling ratio is accomplished by changing the c/a ratio (in order to maintain the circular cross section of the rods). The variation of gap/mid-gap ratio with those parameters will be apparent from an examination of FIG. 11.

Figure 12:
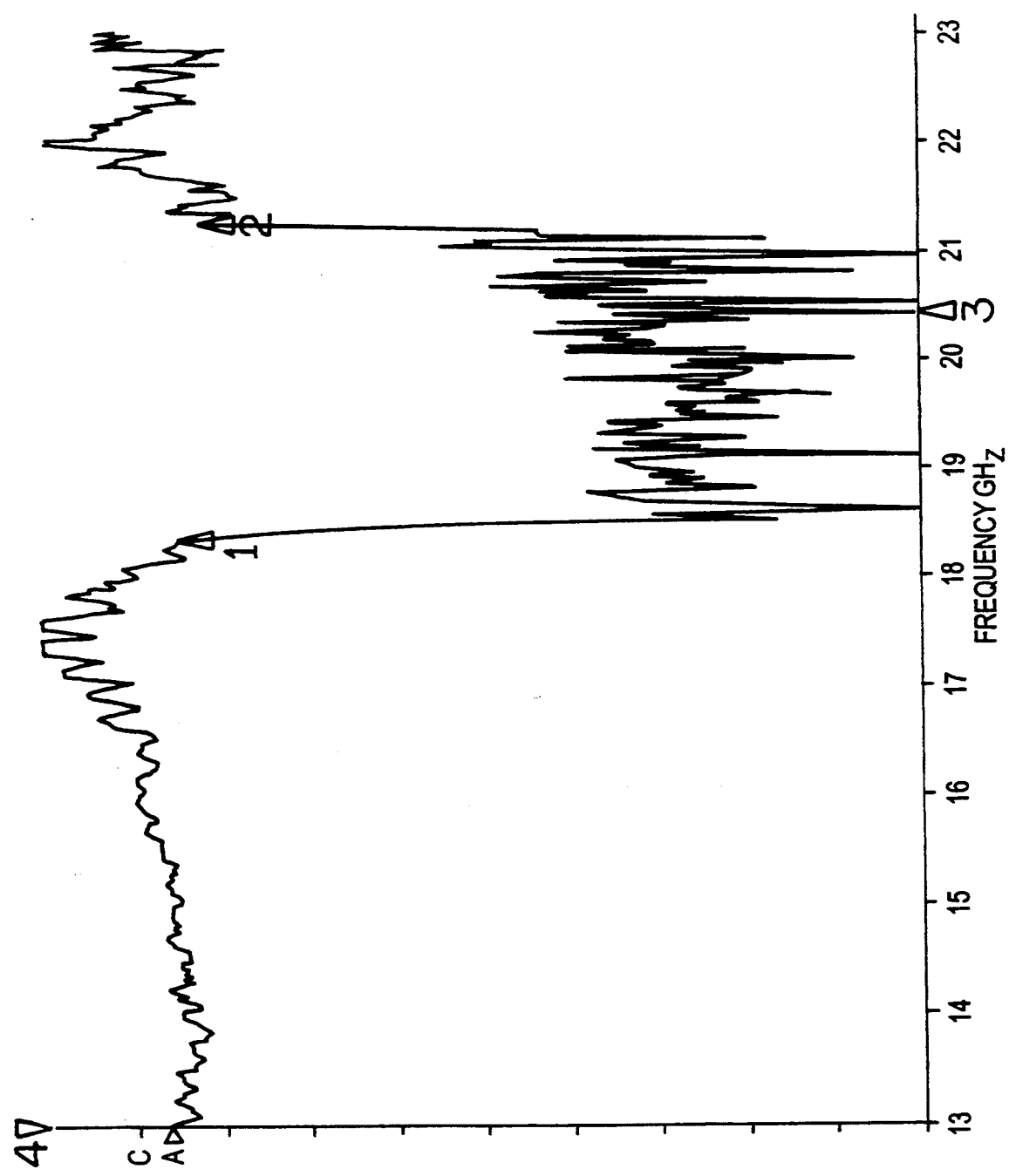
FIGS. 12–14 show experimental results from a microwave model of a periodic dielectric structure of the type shown in FIG. 2, and demonstrating the presence of the photonic band gap in all directions.
Figure 13:
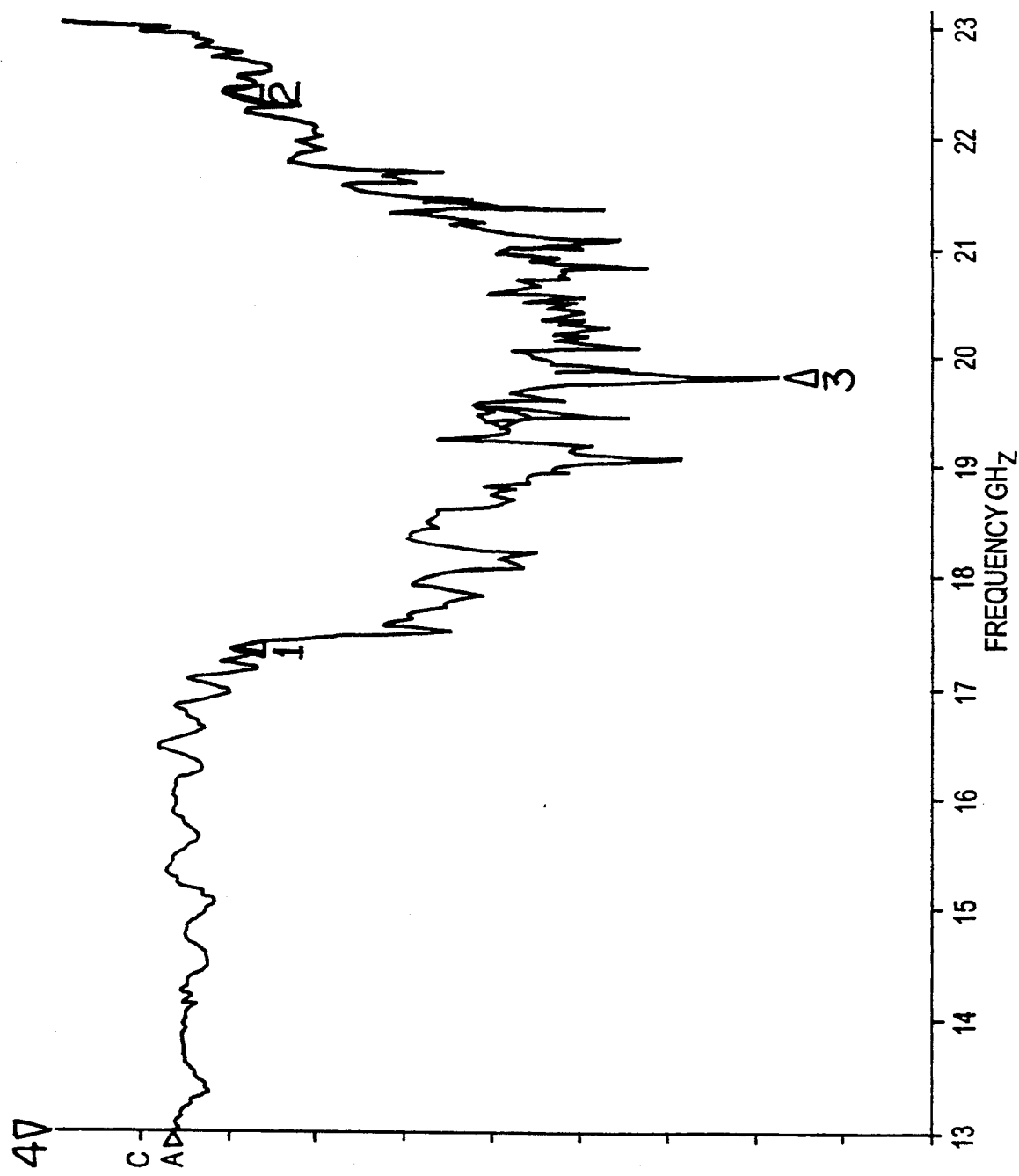
Figure 14:
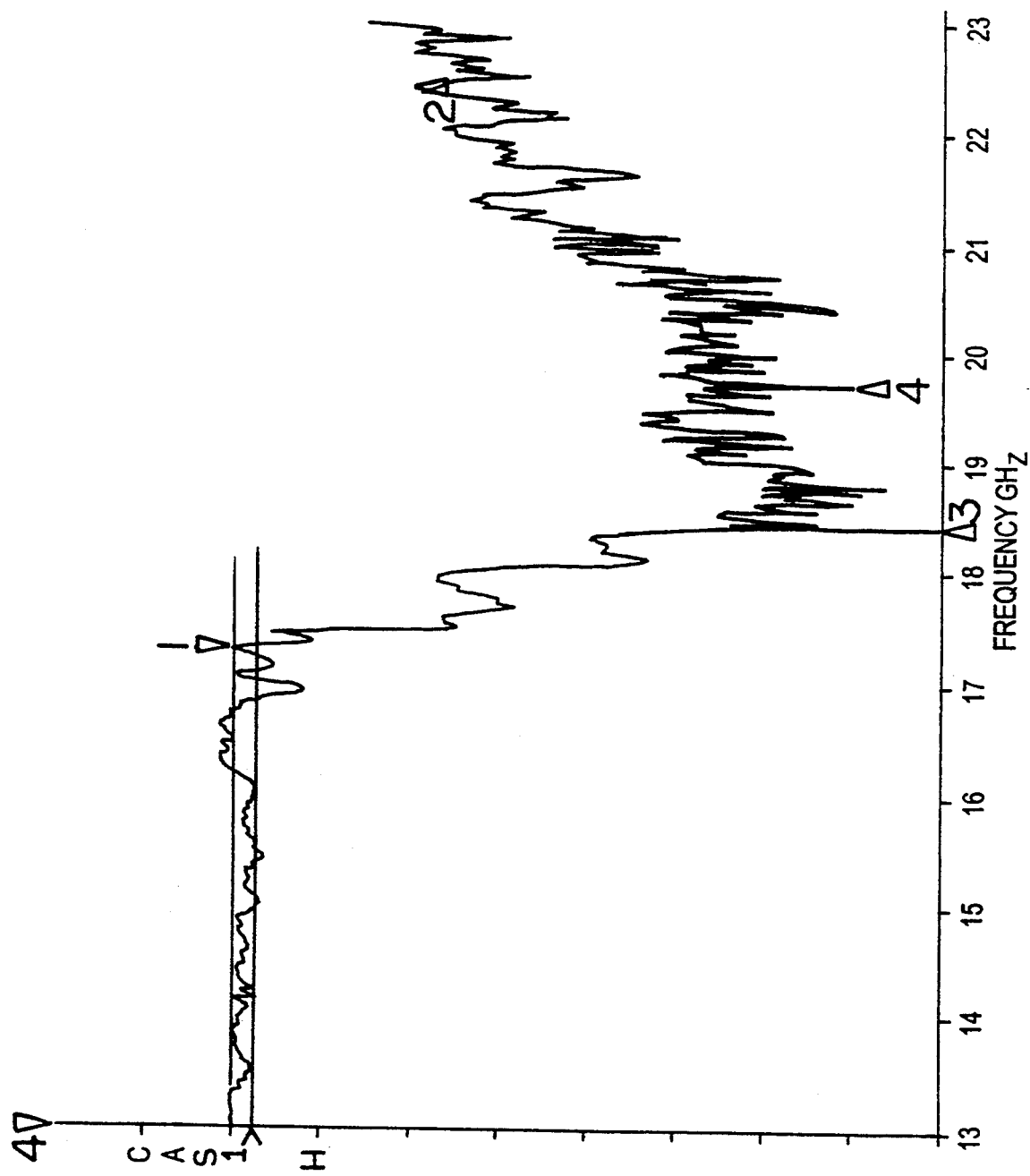

In order to physically demonstrate the results achievable with periodic structures according to the invention, a microwave-size model was constructed and tested. A microwave-size model is one which is scaled up in size from a photonic model, and which will operate at microwave frequencies, in the same way that a photonic model will operate at visible lightwave frequencies. The model was constructed based on the structure of FIG. 2, that is, the use of circular rods arranged in layers with the layers having their rods in contact. The model contained layers of parallel cylindrical alumina rods which were 0.08" in diameter. The center-to-center spacing between rods was 0.28". The model was built of 40 layers, one layer touching the next. There were ten rods per layer arranged on the 0.28" centers. Measurements for the transmission of microwaves through the model in the frequency range of 12 to 24 GHz. demonstrated the presence of a gap in the electromagnetic wave propagation in the "crystal" along the x and z directions for both polarizations. This is illustrated in FIGS. 12–14 which represent the experimental data from the model operated at 12 to 24 GHz. FIG. 12 shows propagation along the x axis and polarization along the z axis. FIG. 13 shows propagation along the x axis and polarization along the y axis (parallel to the rods). It will be seen that a forbidden band exists at about 20 GHz., which is very near the predicted gap center. The arrows at the top of the graph are the predicted gap frequencies which were determined from the calculations set out earlier in this specification. FIG. 14 demonstrates that there is no polarization effect for propagation along the z axis.

| Diameter Of Rods | Spacing Of Rods | Midgap Frequency | Corresponding Wavelength At Midgap |
| --- | --- | --- | --- |
| 0.2 cm | 0.711 cm | 20 GHz. | 15 mm |
| 0.08 cm | 0.284 cm | 50 GHz. | 6 mm |
| 1.33 micron | 4.74 micron | 30 THz. | 10 micron |
| 0.2 micron | 0.711 micron | $2 \times 10^{14}$ Hz. | 1.5 micron |
| 667 Å | 2370 Å | $6 \times 10^{14}$ Hz. | 5,000 Å |

While the preceding description has dealt primarily with the elongate rods as discrete building blocks which are arranged to form the photonic band gap material, entire layers of elongate rods could also be considered as the building blocks of photonic band gap material. In accordance with this implementation, the invention also includes methods for building photonic band gap structures wherein entire layers of elongate rods are formed, and then the layers are stacked together to yield the four-layer periodic structure required to produce a photonic band gap.

Common to these methods is the use of certain photolithographic and material etching techniques, commonly used in semiconductor fabrication, to form the various layers required for a photonic band gap structure. Further, the methods include steps for properly orienting successive layers to form the photonic band gap structure.

In the first of these techniques, semiconductor fabrication methods are used to form layers of spaced elongate rods in a wafer of a dielectric material. The term "wafer," as used herein, is intended to broadly refer to a relatively thin, planar sample of a given material and is not intended to be limited to any specific size, thickness or crystal orientation of the material. These elongate rods are formed by etching a portion of a wafer comprised of dielectric material such that air gaps are formed between the elongate rods. This method not only forms an entire layer of elongate rods simultaneously, but also provides support for those rods as they extend from and are supported by the remaining, surrounding dielectric material of the wafer. Once a number of such wafers have been formed, these wafers can be stacked up together to form the photonic band gap structure. One way to form the stack is by including alignment holes in the wafers, and stacking the wafers on a jig including alignment posts adapted to be received in the alignment holes. In forming the stack, the four-layer periodicity needed for the photonic band gap can be achieved by rotating each wafer with respect to the previous wafer. The means for patterning the wafers ensures that this rotation between successive wafers achieves a photonic band gap structure. The simple stacking of patterned wafers on a jig allows an entire band gap crystal to be easily disassembled and reassembled. Moreover, since standard microelectronic fabrication techniques are used, the frequency range achieved by such photonic band gap materials can be extended to higher frequencies by scaling the whole structure down.

In one embodiment of the present method, a single layer of parallel, spaced elongate dielectric rods is formed in a wafer of dielectric material. Formation of this single layer may be carried out by using the anisotropic etch properties of various crystal planes of the dielectric. In some dielectric materials, crystalline silicon (Si) being an example, different symmetry planes are etched at different rates. As an example, the {110} crystal plane of silicon etches at a rate between 500–2,000 times faster than the etch rate of the {111} crystal plane. By using the preferential etch rate of a given crystal plane according to the method of this invention, a single layer of elongate rods having straight side walls can be formed.

One way to form the single layer of parallel, spaced elongate rods is to orient the desired rods parallel to the {111} crystal plane in {110} oriented wafers. That is, the wafers are patterned such that a portion of the wafers corresponding to the elongate rods are coated such that an etch solution will not contact that portion of the wafer. The wafers are then placed in the etch solution such that the {110} oriented material between the elongate rods, which etches at a significantly faster rate than the {111} material under the protected areas, are etched through. No significant under etch of the covered areas occurs since the material beneath these covered areas is parallel to the {111} plane, which plane etches at the slower rate. Thus, the result of etching through of the {110} wafer that is patterned in this manner is spaced, parallel elongate rods of essentially rectangular cross section.

Figure 15A:
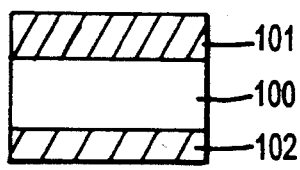
FIGS. 15(a) through 15(i) is a diagrammatic representation of the cross section of a dielectric wafer being processed according to one method of the present invention, at various stages of the processing.

The preparation of a dielectric wafer for this etch to form the elongate rods begins by coating the entire wafer with an oxide. As is well known in the art, aqueous solutions of KOH etch silicon dioxide layers at a very slow rate as compared to the etching of the {110} or {100} crystal plane. Once the wafer is coated with the oxide, the oxide will be removed from the areas corresponding to the air gaps between rods. Placing the thus patterned wafer in the KOH will cause the air gaps to be etched through. For the purposes of carrying out this fabrication method, a 1 micron silicon dioxide layer ($SiO_2$) is thick enough to protect the regions of the silicon wafer which are not to be etched, for a wafer as thick as 500 microns. A cross-sectional view of a dielectric wafer with the oxide grown on is shown in FIG. 15a. Indeed, cross-sectional views of the wafer during various stages of this fabrication method are shown in FIGS. 15a–15h. FIGS. 15a–15h are included for the purpose of illustrating the process steps of this method, and do not necessarily accurately characterize the structure that results from this process. The oxide layers 101 (top) and 102 (bottom) are shown grown on the silicon substrate 100 in FIG. 15a.

Figure 16:
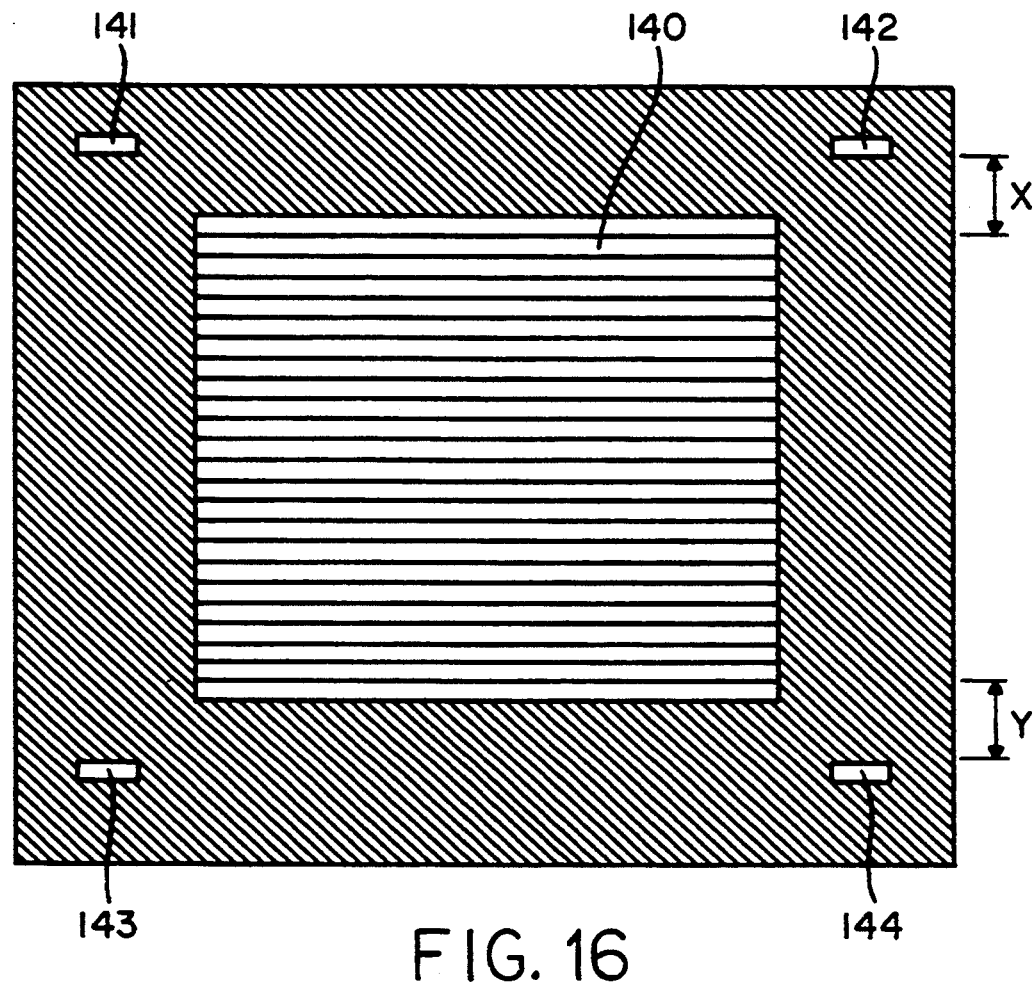
FIG. 16 is an elevational view of a photomask used in one of the processing methods of the invention.

After the oxidation, one side of the wafer is patterned by conventional lithography. The purpose of this patterning is to selectively remove the $SiO_2$ from the areas of the wafer which will correspond to the gaps between the elongate rods. FIG. 16 shows a typical mask layout used for this patterning of the wafers. The square region 140 at the center consists of stripes which will define the dielectric rods in individual layers of the photonic band gap crystal. The four rectangular structures, 141–144 on the corner of the mask are used as pin holes during the alignment process (and will be referred to herein as alignment holes) where the wafers are optionally stacked on an alignment jig. Since the success of patterning the wafer depends on the elongate rods being parallel to the {111} crystal plane of the wafer, the mask which is used to pattern the oxide must be aligned to the crystal such that the stripes in the square region 140 are parallel to the {111} plane. This is easily achieved if the silicon wafer includes a major flat along the {111} crystal plane of the wafer. For wafers without any flats or with a flat at a different orientation, the well-known cleavage property of silicon wafers can be used to cleave the wafers along the {111} direction and to use this cleavage as an alignment flat. Alternatively, if the orientation of the flat of the wafer is known, the wafer can be rotated such that the rods are parallel to the {111} plane. This second technique requires very careful rotational alignment and is harder to implement than the former one.

Figure 15F:
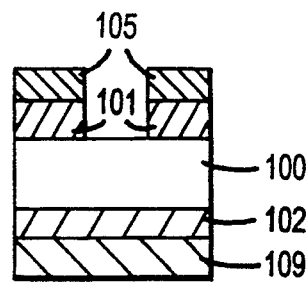
Figure 15B:
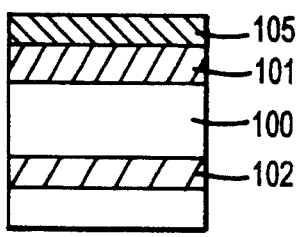
Figure 15G:
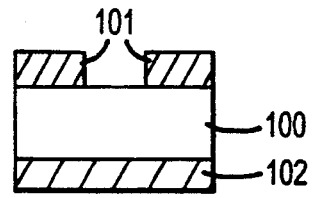
Figure 15C:
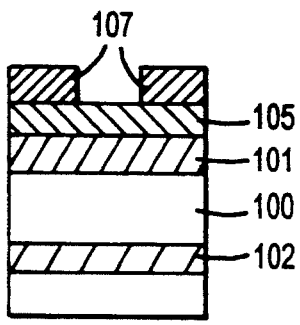
Figure 15H:
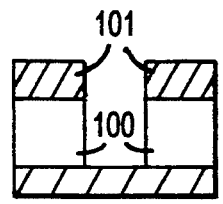
Figure 15D:
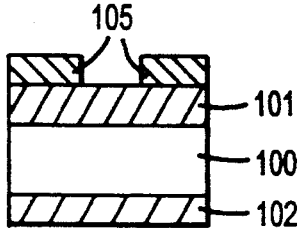
Figure 15I:
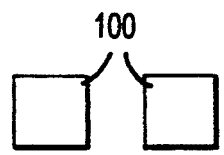
Figure 15E:
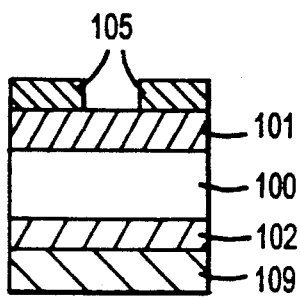

A conventional photolithography technique is used to expose and develop a layer of resist 105 which is spun on the top surface of the wafer as shown in 15b. The mask is then aligned as explained above, and results in the arrangement shown in FIG. 15c where the lines of the mask are shown as 107. A dark mask and positive resist are used. Because of this, exposure and development of the resist removes the resist 105 that was in the area of the wafer not covered by the mask. The result of resist exposure and development is shown in FIG. 15d. Following this step, the resist on the front of the wafer is hardened by a 120° C. bake. Following that bake, a thick layer of resist is spun onto the backside of the wafer and another 120° C. post-bake is performed in order to protect the oxide on the backside of the wafer. A wafer including this backside resist 110 is shown in FIG. 15e. With the portions of the $SiO_2$ corresponding to the gaps between the rods now being exposed, the wafers are dipped into a buffered oxide etch solution to remove the $SiO_2$ between the rods. The wafer with the $SiO_2$ thus removed is shown in FIG. 15f. Once the removal of the oxide between the rods is finished, the resist is washed away, and the oxide layer has the desired pattern. The wafer in this configuration is shown in FIG. 15g.

The wafer is now prepared for the final KOH etch. As noted above, KOH solution preferentially etches the regions that are not covered by the oxide, while the regions that have the oxide are protected. Furthermore, since the rods are oriented parallel to the {111} plane, there is no significant under etch and an almost vertical wall is generated during the etching process. A variety of concentrations and temperatures of KOH solution may be used depending on the required etching speed. A typical concentration and temperature would be 40% KOH (by weight when mixed with water) with an etch temperature of 85° C. The wafer remains in the KOH solution until it is etched through, it being periodically removed to check on the etch progress. A wafer that is completely etched through is shown in FIG. 15h. Following etch through, the wafers are rinsed with deionized water and placed in the buffer oxide etch solution to remove the oxide. A properly patterned finished wafer is shown in FIG. 15i.

Once a plurality of single layer wafers have been formed in this fashion, they are then stacked together to form the photonic band gap crystal. In the case of single-layer wafers, a 90° rotation between each successive wafer in the stack ensures that the required four-layer periodicity is achieved. As discussed above, it is preferable for the rods of alternating layers to be offset from one another by approximately one-half the repeat distance. This is achieved according to the present method by properly selecting the orientation of the alignment holes and the elongate rods in a given wafer. As mentioned above, each wafer may illustratively include four alignment holes 141–144, as seen in FIG. 16. A jig, including four alignment posts may be used to properly align the wafers as they are stacked. Since the wafers are rotated 90° between layers, alternating layers, or those having the orientation of the parallel rods in the same direction, are rotated with respect to each other by 180°.

In order to give the one-half repeat distance offset between such alternating layers, the separation between alignment holes and the square region at the center of a wafer is carefully selected. Referring now to FIG. 16, this careful alignment will now be explained. The distance from the top two alignment holes 141, 142 to a first rod 150 in the square region 100 is equal to a first value, X. Similarly, the distance between a second set of alignment holes 14, 144 and the bottom rod 151 of the square region 100 is equal to a second distance Y. In order to provide for the desired offset, the X dimension differs from the Y dimension by one half the separation distance. Since the four alignment holes 141–144 will always be in alignment, such an orientation of the holes provides that a given layer of rods will have the desired one-half repeat distance offset when it is rotated with respect to another layer of rods by 180°. Thus, since each wafer is rotated 90° relative to the previous, this offset will occur between the first and third layers, moving upwardly, as well as between the second and fourth layers. As a result, the necessary four-layer periodicity for photonic band gaps, shown most clearly in FIG. 1 is formed by this 90° rotation of successive wafers with respect to the previous wafer.

Figure 17:
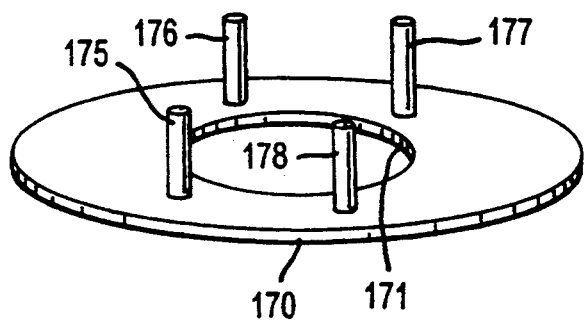
FIG. 17 is a perspective view of an alignment jig for use in a method according to the invention.
Figure 18A:
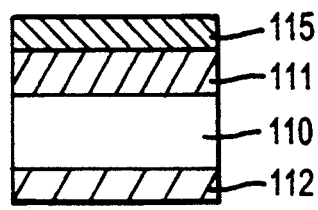
FIGS. 18(a) through 18(f) is a diagrammatic representation of a cross section of a dielectric wafer being processed according to a method of the invention, shown at various stages of the processing.
Figure 18B:
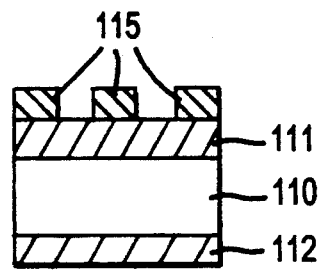
Figure 18C:
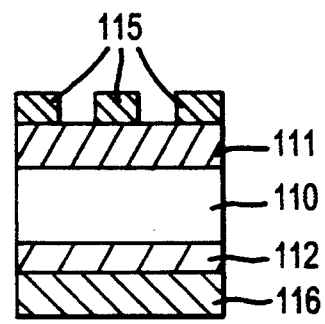
Figure 18D:
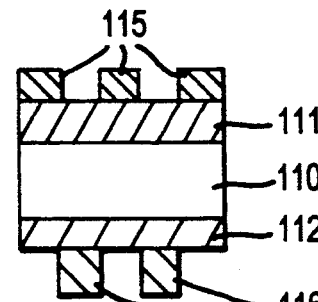
Figure 18E:
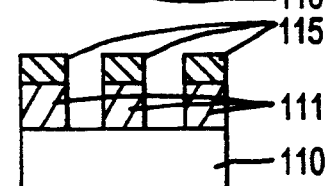
Figure 18F:
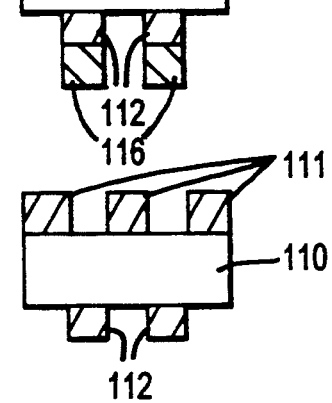

A typical jig that may be used to facilitate the stacking process is shown in FIG. 17. The jig is simply a circular piece of plexiglass 170 including a central opening 171. Four circular alignment posts 175–178 are mounted in the base 170. The jig may include a complemental cover having holes for receiving the posts. The posts 175–178 are received in complemental alignment holes in the patterned wafers. It should be noted, in reference to FIG. 16 that the alignment "holes" formed by mask sections 141–144 are actually elongated along the same axis as the rods. This ensures that the resulting alignment holes have straight sidewalls. These elongated alignment holes allow for lateral movement of a given wafer on the jig, along the direction of the rod axis. This lateral movement does not affect the photonic band gap structure since this movement does not change the offset between alternating layers, which must be kept constant to yield the required four-layer periodicity.

This method, by which individual layers of photonic band gap are easily formed, by existing fabrication techniques, and then stacked may be scaled down for the purpose of increasing the frequency range of the photonic band gap material. Using the reference letters of FIG. 1a, the "a" dimension and the "x" dimension may be modified by changing the dimensions of the dark and light portions of the mask used for the photolithography process. Furthermore, dimensions "c" and "z" may be modified by using thinner wafers. Use of this fabrication method results in photonic band gaps of around 100 GHZ for rods having a width of 340 microns formed on 380 micron thick dielectric material, the rods being separated by 1275 microns.

Figure 25:
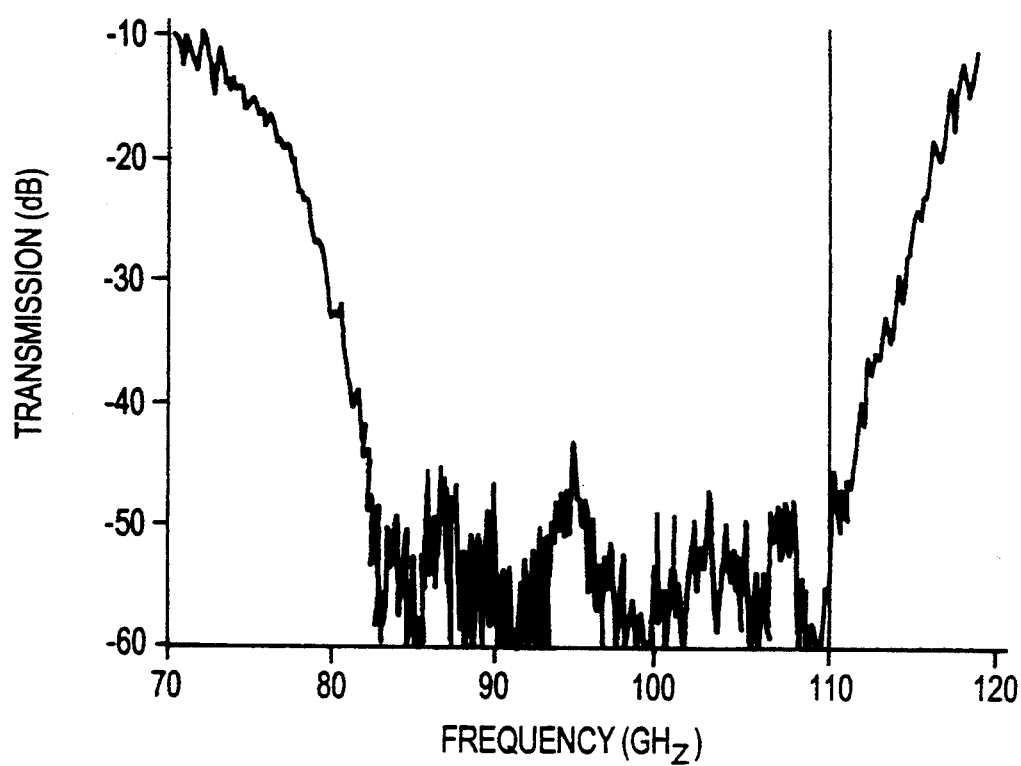
FIG. 25 shows experimental results from a microwave model of a periodic dielectric structure formed according to the method and demonstrating a photonic band gap.

Measurements for the transmission of microwaves through a photonic band gap structure meeting these specifications, and formed according to this method, were performed. These measurements demonstrated the pressure of a gap in the electromagnetic wave propagation about a mid-gap frequency of approximately 100 GHZ, as depicted in FIG. 25. Of course, the values will vary with dielectric constant, filling ratio, etc., as previously discussed.

It may also be desirable to form a single layer of elongate rods in a dielectric wafer that does not exhibit the anisotropic etch properties of other dielectric materials. An example of a dielectric not exhibiting the advantageous anisotropic etch properties is alumina. When it is desired to use such dielectric material for forming photonic band gap structures, laser machining of the wafers, as opposed to chemical etching of the wafers, may be used to form the elongate rods. In this embodiment of the method of the invention, the regions of the wafer corresponding to the alignment holes and the gaps between the elongate rods are removed by conventional laser machining techniques. The same alignment techniques are used to orient the alignment holes with respect to the elongate rods, so that stacking of the resulting wafers, with 90° rotation between successive layers, forms the four-layer periodicity crystal required to exhibit photonic band gaps. Thus, this method, wherein a layer of elongate rods is formed in a dielectric wafer, and then the wafers are stacked by rotating each wafer with respect to the previous wafer can be used to create photonic band gap structures by either etching or laser machining the wafers.

A similar method of 1) forming layers in a dielectric wafer and 2) stacking the wafers, is also used wherein two layers of elongate rods are formed in a single wafer. That is, one layer of elongate rods is formed on the frontside of the wafer, and a second layer of elongate rods, rotated relative to the first, is formed on the backside of the wafer. Since the dimensions of the elongate rods must be reduced to increase the frequency of the band gap, this method of producing the elongate rods is advantageous as each layer is half the height of a layer that would be formed according to the single layer method, for a given wafer thickness.

Like the single layer method described above, the present method, referred to herein as the "double-etch" method, uses the anisotropic etch properties of a crystalline dielectric to form the desired layers. However, the preferential etch rate of a first plane (illustratively the {110} plane of Si) is used, as compared to three different {111} planes, which are angularly offset from each other. In the present embodiment, the two {111} planes are offset from each other by 70.2°. The rods of the first or top layer of the two layer wafer are parallel to a first {111} crystal plane, while the rods of the bottom layer are parallel to the other {111} plane, and are thus rotated with respect to the top layer by the 70.2° angle between the two crystal planes. Proper orientation and alignment of these two layers and the alignment holes according to the method of the invention allows a four-layer periodic material exhibiting a photonic band gap to be formed by stacking successive two-layer wafers and including a 180° rotation between successive wafers.

Since the orientation of the top layer and bottom layer of elongate rods is different in a wafer formed according to this method, two different masks must be used to properly pattern the wafer. In order to properly align the masks to the front and back of the wafer, the wafer must include a common reference point visible both from the front and the back of the wafer. To provide for such a reference, the first step in this double-etch method of forming photonic band gap material is to etch the alignment holes through the wafer. The same photolithography techniques described above in relation to forming of the single layer rods is used. That is, an oxide layer is grown over the entire wafer. For the double-etch procedure, an oxide layer of 2.0 microns is sufficient for a 250 micron thick wafer. Lithography is then used to pattern photoresist such that the oxide areas above the alignment holes are exposed. The oxide in those exposed areas is then removed by an oxide etch. Finally, the wafer is dipped in a KOH solution which etches away the wafer in the alignment hole area only. To ensure that the alignment holes have straight sidewalls (so that their position on either surface of the wafer is the same), they are formed as trapezoids, with each set of parallel sides being parallel to one of the nonpreferentially etched {111} crystal planes. A further important reason for making the alignment holes trapezoidal will be discussed below.

Once the alignment holes are thus formed, the patterning of the oxide layers to allow etching of the two layers of elongate rods can be carried out. The method by which this is achieved is pictorially represented in FIG. 18 which shows cross-sectional views of the wafer during various processing stages. FIGS. 18a–18f are limited, however, in that they do not accurately depict the 70.2° angle between the rods on the top surface of the wafer, and those on the bottom. Rather, these figures merely illustrate the processing steps of the double-etch wafer while not accurately depicting the resulting structure. Oxide layers 111 and 112 are formed on substrate 110. Photoresist 115 is added to the top layer of the wafer (18a), and is exposed and developed so that the region of the oxide above the gaps between the elongate rods is exposed (18b). The second photomask shown in FIG. 19, which is used for this patterning, is aligned to the wafer by aligning the trapezoids on the mask with the previously-etched trapezoidal alignment holes. After a hard-bake of the resist at 120° C. for 30 minutes, resist 116 is spun onto the backside (18c), and is pre-baked at 90° C. for 25 minutes. The third photomask shown in FIG. 20, in which the rods are aligned to the other {111} crystal plane is then aligned to the alignment holes, and the resist is exposed and developed. At this point, both the top and bottom of the wafer are patterned such that the oxide is exposed in the regions between the elongate rods in the respective layers (18d). Following a hard bake of the backside resist, the wafers are dipped in a buffered oxide etch solution to remove the exposed oxide (17e). The wafers are then dipped in a solvent to remove the resist from front and back (18f).

The wafers are now ready for etch-through in the KOH solution. Again, a concentration of 40% KOH (by weight in water) is used at a temperature of 75° C. The wafers are periodically removed from the etch solution to check on their progress. Once the wafers are etched all the way through, the etching is stopped and the wafers are rinsed.

Figure 19:
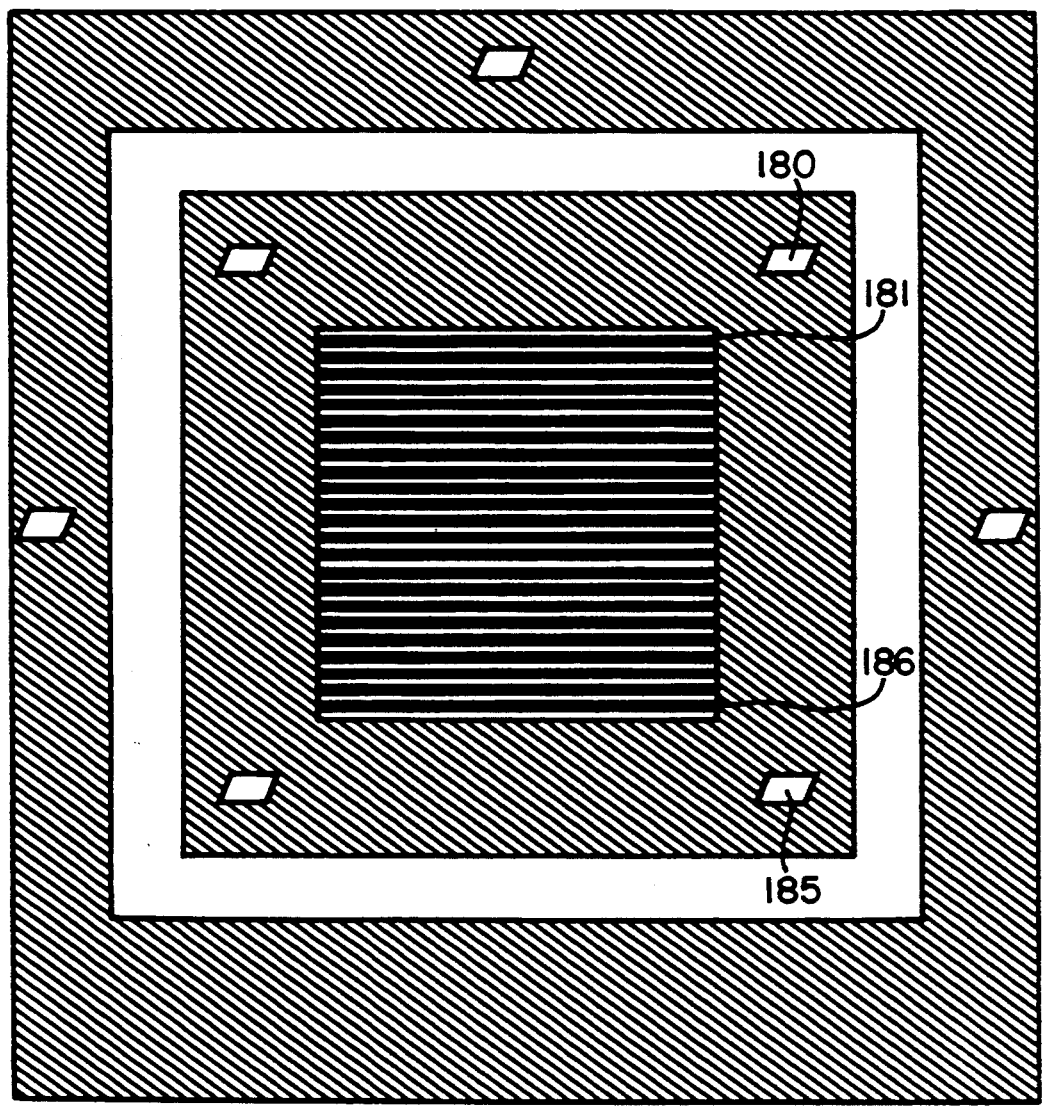
FIG. 19 is an elevational view of a photomask used in the double-etch method of the invention.
Figure 20:
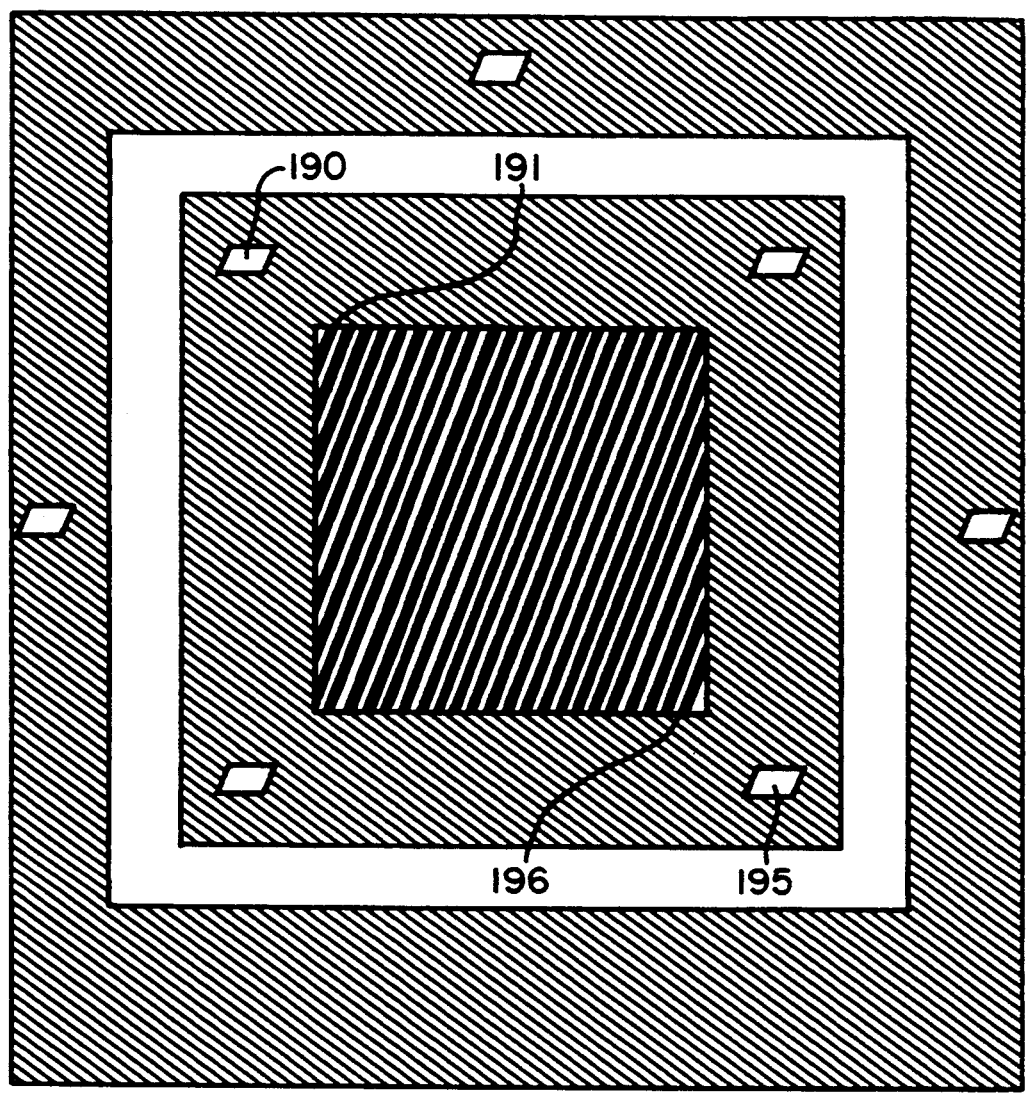
FIG. 20 is an elevational view of a second photomask used in the double-etch method of the invention.

A photonic band gap structure is then formed by stacking of a plurality of wafers formed in this manner. A similar stacking jig to that shown in FIG. 17, and having four milled circular posts, is used for alignment and stacking of the wafers. Unlike the single layer method, however, the wafers in this double-etch method are rotated 180° between successive wafers. This stacking method provides the necessary four-layer periodicity for achieving photonic band gaps. As in the single-layer stacking, the rods of alternating layers are offset from each other by approximately one half the separation distance between rods. To provide this offset, both of the elongate rod patterns are oriented with respect to their alignment holes in a similar manner as in the single layer method. This can be seen by reference to FIG. 19, showing the top surface alignment mask, and FIG. 20, showing the bottom surface alignment mask. In FIG. 19, the distance between a first alignment hole 180 and a top rod 181 of the elongate rods differs from the distance between a second alignment hole 185 and a bottom rod 186 by half the separation distance between successive rods. A similar relationship holds between hole 190 and rod 191 and hole 195 and rod 196 if the mask of FIG. 20, and thus on the bottom layer of the wafer. Accordingly, 180° rotation of successive double-etched wafers yields the desired four-layer periodicity.

Figure 21:
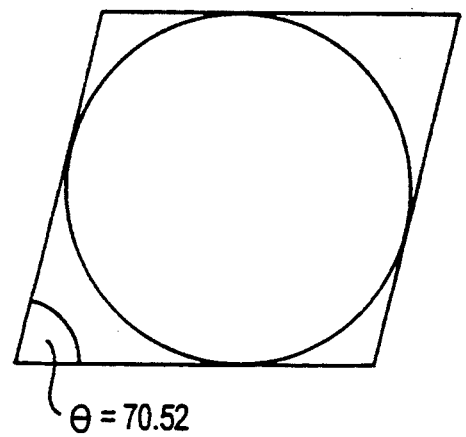
FIG. 21 is a diagram showing the relationship between the alignment posts of the alignment jig and an alignment hole in a wafer formed according to the double-etch method.

Since a single wafer contains two separate planar layers of elongate rods, relative motion between successive wafers, allowable in the single layer wafer stacking, is not allowable in the stacking of the present method. The configuration of the alignment holes in the double-etch method prevents such relative movement. As mentioned previously, the alignment holes are trapezoidal and have straight sidewalls. A trapezoidal shape, with each set of parallel sides parallel to a {111} plane was chosen to ensure the straight sidewalls. The lengths of the sides of these trapezoids were also carefully chosen, to ensure that the alignment rods of the alignment jig exactly fit within the trapezoids, and to prevent any relative lateral movement of the stacked wafers. The orientation of one of the trapezoidal alignment holes and one of the alignment posts is shown in FIG. 21. It can be seen in that figure that the post contacts all four sides of the trapezoid, thus holding the wafer in position. In the present embodiment, posts having a diameter of 0.025" were used. The length of the sidewalls of the trapezoid were then chosen taking into account the 70.52° angle $\theta$ shown in FIG. 21. This is the angle between respective {111} planes referred to above.

The double-etch structure just described is advantageous for forming higher frequency photonic band gap structures since layers of half the height which would be available in single layer wafers can be formed. This in turn allows a unit cell of four-layer periodicity to be formed by only two wafers, thus reducing material costs with respect to the single layer structure. Moreover, the double-etch structure also has significant structural stability since the rods on one side of the wafer are monolithically connected to the rods on the other side of the wafer. The advantages realized by the double-etch structure must also be balanced against the fact that the process involves exposing the wafer to increased handling, since three lithography steps are required to be performed on each wafer, as opposed to one in the single layer structure. Further, the increased number of process steps means that more handling of the wafers is required, which could result in breakage. Thus in determining which version of the forming and stacking operation to use to obtain photonic band gap material at a given frequency, these various factors should be carefully weighed.

Figure 22:
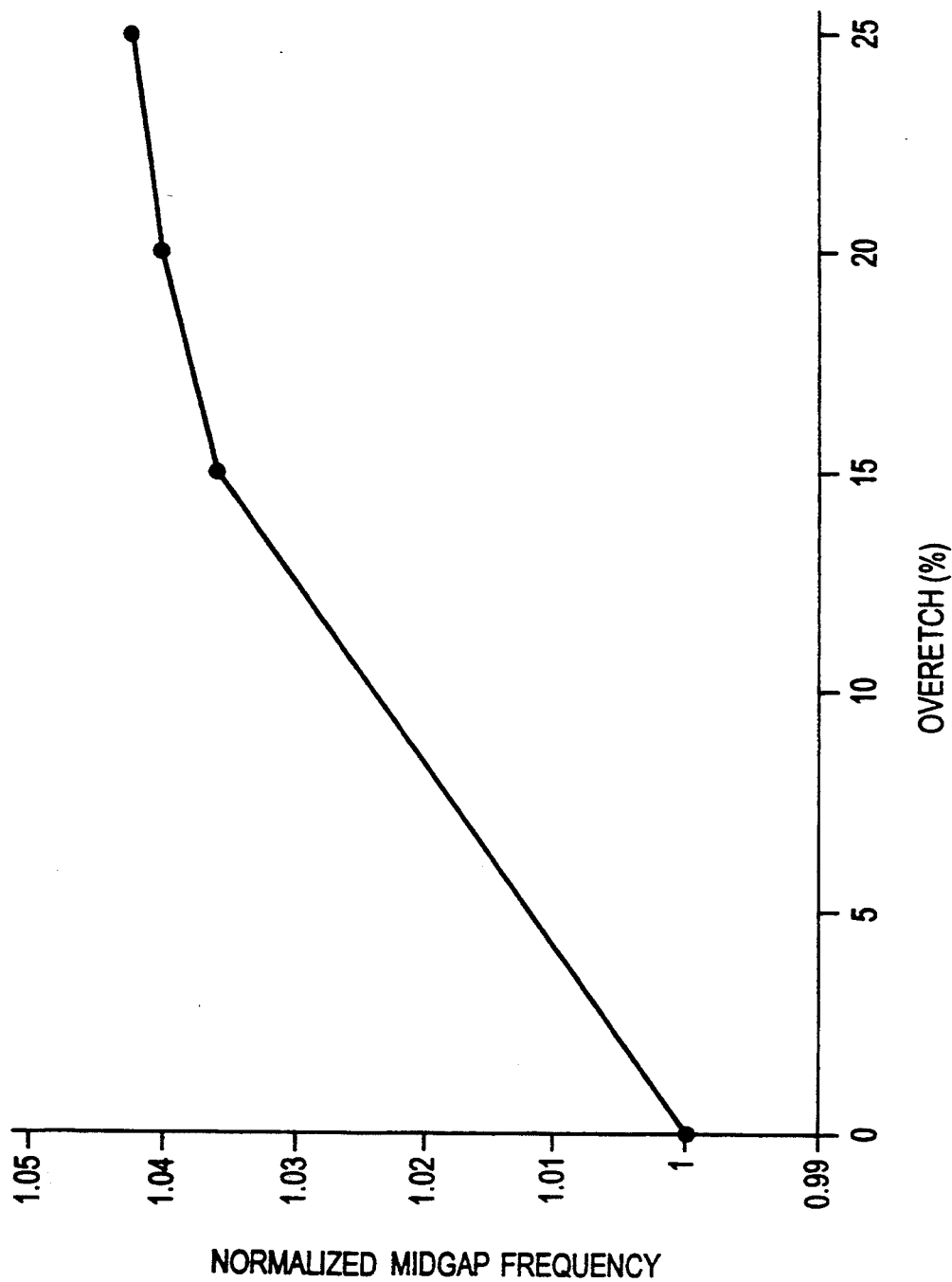
FIG. 22 is a graphical representation showing the dependence of the normalized mid gap frequency on the over etch percentage for the double-etch structure.

One further advantage of the double-etch method is the possibility of tuning the mid-gap frequency of a given structure. As mentioned earlier, the mid-gap frequency of a photonic band gap crystal may be modified by changing the filling ratio as by notching of the rods at the point of contact with rods in the layer below. A similar "notching" can be obtained by overetching the double-etch wafers. Overetch is accomplished by simply exposing etched-through wafers to the KOH etch solution for longer periods of time. A theoretical graphical representation of the effect of overetch of the double-etch structure on mid-gap frequency is seen in FIG. 22. Since the method of the present invention provides for simple stacking and unstacking of wafers of a given crystal, wafers can be repeatedly overetched by incremental amounts and restacked until the resulting stack yields the desired mid-gap frequency.

While the method of etching a planar layer, or layers in a dielectric wafer, and then stacking the wafers yields photonic band gap structures, there are physical limitations to such a method. For example, the minimum wafer thickness will be limited by the fragility of the wafers. Chemical thinning of formed wafers and special handling may reduce this limitation, but others exist. The dimensions of the machined jig and its alignment posts is only precise down to around 10 microns. Assuming a liberal 20% tolerance limit for forming photonic band gap structures, this 10 micron limit puts the minimum dimension of a stacked layer to be around 50 microns, which would yield a photonic band gap around a wavelength of 100 microns, equating with a roughly 3 THz mid-gap frequency.

To provide for even further size reduction of the photonic band gap structure, and concomitant increase in mid-gap frequency, a further fabrication method is provided. According to this method, standard lithography techniques are applied to a single wafer to build up individual, properly-oriented layers of elongate rods of dielectric material which form a structure having the required four-layer periodicity. In this process, each layer is first bonded to a previous layer, and is then patterned using photolithographic techniques. Since lithography tools can achieve sub-micron alignment accuracy, and the thickness of each layer can be as small as 0.1 micron, this technique can be used to build photonic band gap crystals at optical wavelengths from 0.3 micron to 10 micron.

Figure 23A:
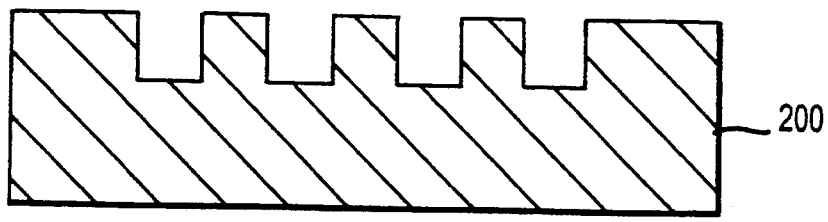
FIGS. 23(a–d) is a diagrammatic representation of the cross section of a dielectric wafer being processed according to a further method of the invention, showing various stages of the processing.
Figure 23B:
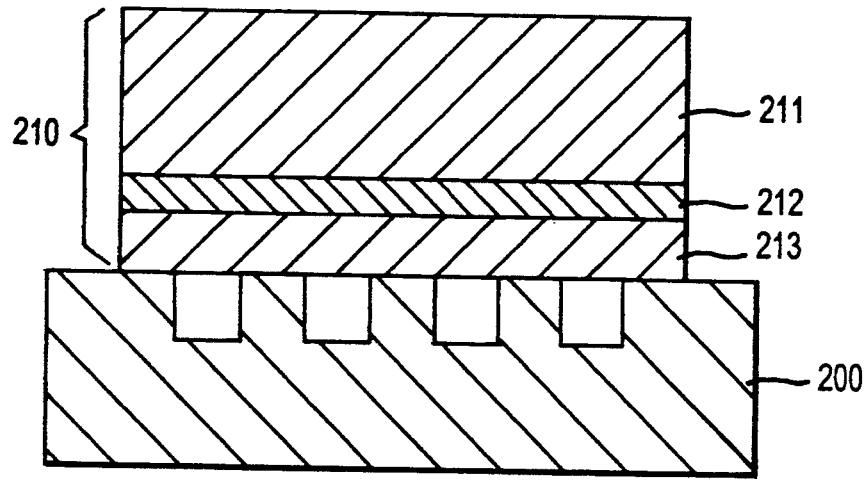
Figure 23C:
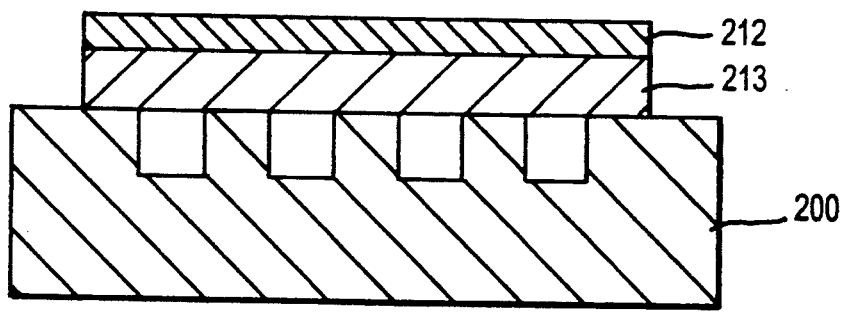
Figure 23D:
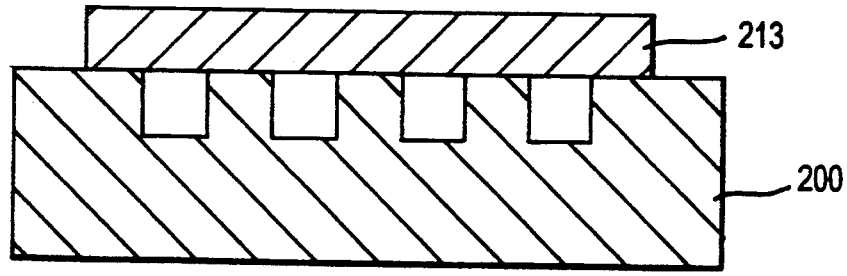

The process starts with patterning of the original substrate, illustratively Si. A typical pattern consisting of parallel rods is etched on the substrate. An illustration of a cross-section of the wafer during the various steps of this process can be seen in FIG. 23. This layer, formed by standard photolithographic techniques, is seen in FIG. 23a. Next, another wafer 210 with a special epitaxial layer structure is brought in contact with the etched substrate 200 (23b). The contact is principally made in the area of the etched substrate beyond the etched region, which ensures good contact between the substrates. This bonding itself may either be done by gluing, or by a special surface treatment of the mating surfaces, which allows for their bonding at the atomic level.

The next step is the etch back of the two layers 211 and 212 overlying the transfer layer 213. As can be seen in FIG. 22, the transfer layer 213 and the transfer substrate 211 are separated by a special etch-stop layer 212. The etch stop layer 212 is chosen such that when the transfer substrate is etched, the etch will stop at this layer. A number of options are available for forming such an etch-stop layer. For Silicon wafers, highly doped (p++) layers can be used. For GaAs wafers, an AlGaAs layer can be used.

Once the whole transfer substrate 211 is etched (23c), the wafer and its associated bonded structure are removed from the etch solution. This step is followed by another selective etch step which is designed to etch only the etch-stop layer 212 (23d).

This results in a structure where a very thin semiconductor transfer layer 213 is bonded on a patterned substrate 200. The thickness of the transfer layer 213 can be chosen during its epitaxial growth before bonding, and may be thinner than 0.1 micron.

At this point in the process, the transfer layer 213 is patterned using photolithographic techniques. A layer of photoresist is applied, and then the mask for the next layer is aligned to the underlying pattern. Once the resist is patterned and baked, the transfer layer is etched chemically, or with a reactive ion etch, to result in rods that are perpendicular to the direction of the rods in the substrate 200.

Figure 24:
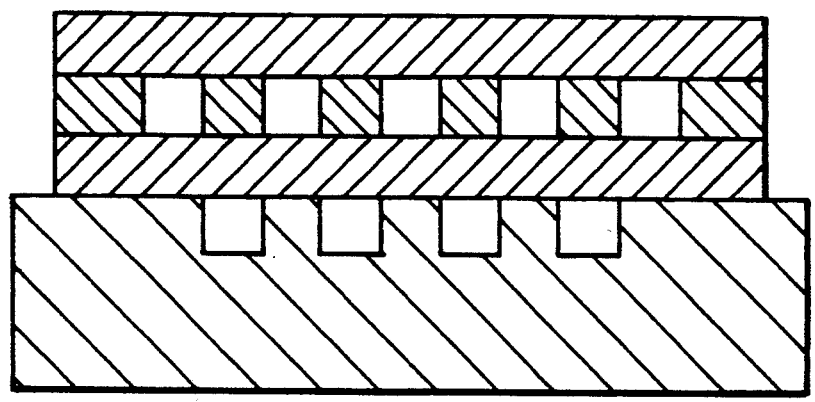
FIG. 24 is a diagrammatic representation of a photonic band gap crystal formed according to a further method of the invention.

Once this etch is completed, two patterned layers that are bonded to each other result. The process can then be repeated again by bonding on another epitaxial structure, etching back the substrate and etch-stop layer and patterning the transfer layer. This process is repeated until the desired number of layers is reached, illustratively as in FIG. 24. The resulting structure will be very similar to those previously described in relation to other fabrication techniques for rod-based millimeter wavelength photonic band gap structures, but the dimensions will be 100–1000 times smaller.

It is apparent that what has been provided is a dielectric structure which on the one hand is capable of achieving a photonic band gap, and on the other hand is capable of practical production. The microwave model was easily fabricated, and the model was tested at microwave size because of the ability to use structures which are easily assembled by hand. Using microelectronic fabrication techniques, methods are provided which allow one to produce this structure at a much smaller scale. The important factor is that the device is constructed in layers, and one layer is laid over the other, for a device which is self-supporting and easily constructable. The substantial advantage this construction achieves over the use of dielectric spheres or the drilling specially oriented holes in dielectrics of the prior art will now be apparent.

Thus, the invention provides a readily fabricatable structure exhibiting a photonic band gap. Elongate rods form each given layer with the rod axes parallel to one another and at a given spacing. A second layer can be formed in the same fashion, but with the axes at an angle to and preferably perpendicular to the rods of the first layer. The third layer has its axes parallel to the first, but has the rods in the mid-gap in the first layer. The fourth layer has its axes parallel to the second, but with the rods mid-gap of the second. Thus, a four-layer periodic structure is repeated until a three-dimensional structure of desired dimension is achieved. The practical advantage of the invention makes it possible to readily achieve the photonic band gap structure.

The invention also provides a method for forming an entire layer or layers of elongate rods in dielectric wafers. The wafers thus formed are stacked together to achieve the photonic band gap structure. Another method provides for fabrication of successive individual layers on a single wafer, where the material to form a layer is bonded to the previous layer, then patterned to form properly oriented elongate rods.

What is claimed is:

1. A periodic dielectric structure which exhibits a photonic band gap comprising, in combination:

a plurality of dielectric rods arranged in a matrix of a material having a different and contrasting refractive index, a number of said rods being arranged to form a planar layer, and a plurality of layers being stacked one on the other to form a three-dimensional structure, each layer having a plurality of rods arranged with parallel axes at a given spacing, each layer having its axes oriented at an angle with respect to its adjacent layers, alternate layers having their axes parallel to each other with the rods of one layer in offset between the rods of the other, thereby to form a three-dimensional structure of stacked layers having a four-layer periodicity, the dimensions of the rods, and the spacing between the rods, being selected to produce a photonic band gap at a given wavelength.

2. The combination as set forth in claim 1 wherein the alternate layers are arranged with the rods of one layer offset at about the midpoint between the rods of the other layer.

3. The combination as set forth in claim 2 wherein the material of the matrix is air.

4. The combination as set forth in claim 1, wherein the angle is other than 90°.

5. A method of fabricating a periodic dielectric structure exhibiting a photonic band gap, comprising the steps of:

(a) forming alignment holes in a wafer of dielectric material having a given crystal orientation;

(b) forming at least one planar layer of elongate rods in a section of the wafer, including the step of selectively removing the dielectric material between the rods;

(c) repeating steps (a) and (b) on a plurality of wafers to form a plurality of patterned wafers; and (d) forming a stack of patterned wafers having a four-layer periodicity by rotating each successive wafer with respect to the next-previous wafer, and then placing the successive wafer on the stack.

6. The method of claim 5, wherein the step of selectively removing dielectric material between the rods is performed by laser machining the wafer.

7. The method of claim 5, wherein the step of selectively removing dielectric material between the rods is performed by chemically etching the wafer.

8. The method of claim 7, wherein a single planar layer of elongate rods is formed in a wafer.

9. The method of claim 8, wherein forming the alignment holes and the elongate rods includes the steps of:
   (a) growing an oxide layer on the dielectric wafer;
   (b) selectively removing the oxide from an upper surface of the wafer and exposing the areas of the wafer for the alignment holes and between the elongate rods;
   (c) preferentially etching the wafer with a solution that etches only in the areas of the wafer not covered by the oxide;
   (d) stopping the etch when the alignment holes and areas between the rods are etched through; and
   (e) removing the oxide from the wafer.

10. The method of claim 9, wherein the steps of selectively removing the oxide comprises the steps of:
    (a) depositing photoresist on the upper surface of the wafer;
    (b) aligning a photomask, including mask rods corresponding to the elongate rods, such that the mask rods are parallel to a first symmetry plane;
    (c) exposing, developing a bake-hardening the resist;
    (d) depositing and baking a layer of photoresist on the back surface of the wafer; and
    (e) etching the oxide in a buffered oxide etch solution to remove the oxide in the areas between the rods and in the alignment holes.

11. The method of claim 10, wherein the step of preferentially etching is achieved by using an etch solution with a significantly faster etch rate along the given crystal orientation of the wafer than along the first symmetry plane.

12. The method of claim 8, and including orienting the alignment holes with respect to the elongate rods such that the distance between a first set of alignment holes and a first rod differs from the distance between a second set of alignment holes and a last rod by half the separation distance between successive rods.

13. The method of claim 12, wherein the step of forming a stack of patterned wafers includes rotating each wafer 90° with respect to the next-previous wafer, and then placing the successive wafer on the stack.

14. The method of claim 7, wherein the step of forming the alignment holes and forming the planar layer are performed simultaneously by chemically etching the wafer.

15. The method of claim 7, wherein forming the elongate rods includes the steps of:
    (a) growing an oxide on the wafer;
    (b) selectively removing the oxide from a first surface of the wafer and exposing the area of the wafer between the first elongate rods;
    (c) selectively removing the oxide from a second surface of the wafer and exposing the area of the wafer between the second elongate rods;
    (d) preferentially etching the wafer with a solution that etches only in the area of the wafer not covered by the oxide; and
    (e) stopping the etch when the areas between the rods are etched through.

16. The method of claim 15, wherein the steps of selectively removing the oxide from the first surface and the second surface are performed together, and further comprise the steps of:
    (a) depositing photoresist on the first surface of the wafer;
    (b) aligning a first photomask, including mask rods corresponding to the first elongate rods, such that the mask rods are parallel to a first symmetry plane;
    (c) exposing, developing, and bake hardening the photoresist on the first surface;
    (d) depositing photoresist on the second surface of the wafer;
    (e) aligning a second photomask, including mask rods corresponding to the second elongate rods, such that the mask rods are parallel to a second symmetry plane;
    (f) exposing, developing and bake-hardening the photoresist on the second surface; and
    (g) etching the oxide in a buffered oxide etch solution to remove the oxide in the areas between the first and second elongate rods.

17. The method of claim 16, wherein the step of preferentially etching is achieved by using an etch solution with a significantly faster etch rate along the given crystal orientation of the wafer than along the first and second symmetry planes.

18. The method of claim 16, wherein the first and second photomasks are aligned to the first and second symmetry planes by aligning the photomasks to the alignment holes.

19. The method of claim 15, and including orienting the alignment holes such that the distance between a first alignment hole and a top rod of the first elongate rods differs from the distance between a second alignment hole and a bottom rod of the first elongate rods by half the separation distance between successive first elongate rods.

20. The method of claim 19, and including further orienting the alignment holes such that the distance between a third alignment hole and a top rod of the second elongate rods differs from the distance between a fourth alignment hole and a bottom rod of the second elongate rods by half the separation distance between successive second elongate rods.

21. The method of claim 20, wherein the step of forming a stack of patterned wafers includes rotating each wafer 180° with respect to the next-previous wafer, and then placing the successive wafer on the stack.

22. A method of claim 5, wherein the stacking step includes placing each patterned wafer on an alignment jig including alignment posts adapted to be received in the alignment holes.

23. A method for fabricating a periodic dielectric structure exhibiting a photonic band gap, comprising the steps of:
    (a) patterning a portion of a substrate of given dielectric material to form a layer of parallel rods;
    (b) bonding an epitaxial layer structure to the substrate, the epitaxial layer including a transfer layer of the given dielectric material, an etch-stop layer and a substrate layer;
    (c) etching the substrate layer;
    (d) etching the etch-stop layer;
    (e) patterning the transfer layer to expose an area of the transfer layer corresponding to a pattern of parallel rods having an axis perpendicular to an axis of the rods of the previous layer; and (f) repeating steps (b)–(e) and successively adding layers of parallel rods until the desired number of layers is reached.

24. The method of claim 23, including offsetting the rods of alternate layers, such that the rods of one layer are at about the midpoint between the rods of the other layer.

* * * * *